(12) United States Patent
Yoshihara et al.

(10) Patent No.: US 6,949,284 B2
(45) Date of Patent: Sep. 27, 2005

(54) COATING COMPOSITION, IT'S COATING LAYER, ANTIREFLECTION COATING, ANTIREFLECTION FILM, IMAGE DISPLAY AND INTERMEDIATE PRODUCT

(75) Inventors: Toshio Yoshihara, Tokyo (JP); Seiji Shinohara, Tokyo (JP); Satoshi Shioda, Tokyo (JP); Hiroko Suzuki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/221,875

(22) PCT Filed: Jan. 15, 2002

(86) PCT No.: PCT/JP02/00179
§ 371 (c)(1),
(2), (4) Date: Sep. 16, 2002

(87) PCT Pub. No.: WO02/055612
PCT Pub. Date: Jul. 18, 2002

(65) Prior Publication Data
US 2003/0096102 A1 May 22, 2003

(51) Int. Cl.[7] .............................. B32B 9/00
(52) U.S. Cl. .................. 428/212; 428/375; 428/402; 428/403; 428/405; 428/407; 502/349; 502/350; 502/351; 502/352
(58) Field of Search .................. 428/212, 375, 428/402, 403, 405, 407; 502/150, 170, 171, 172, 349, 358, 351, 352

(56) References Cited
U.S. PATENT DOCUMENTS

| | | | |
|---|---|---|---|
| 5,719,205 A | | 2/1998 | Yoshihara |
| 5,770,306 A | * | 6/1998 | Suzuki et al. ............... 428/328 |
| 6,166,855 A | * | 12/2000 | Ikeyama et al. ............ 359/580 |
| 6,210,858 B1 | * | 4/2001 | Yasuda et al. ........... 430/270.1 |
| 6,502,943 B2 | * | 1/2003 | Nakamura et al. .......... 359/603 |
| 2002/0018886 A1 | * | 2/2002 | Matsufuji et al. ........... 428/328 |

FOREIGN PATENT DOCUMENTS

| | | |
|---|---|---|
| JP | 7-149520 | 6/1995 |
| JP | 8-297201 | 11/1996 |
| JP | 11-310755 | 11/1999 |
| JP | 2000-204301 | 7/2000 |
| JP | 2000-336313 | 12/2000 |
| JP | 2001-272502 | 10/2001 |
| WO | WO 00/27931 | 5/2000 |

\* cited by examiner

Primary Examiner—Deborah Jones
Assistant Examiner—G. Blackwell-Rudasill
(74) Attorney, Agent, or Firm—Timothy J. Keefer; Seyfarth Shaw LLP

(57) ABSTRACT

The present invention provides an application material capable of forming a thin layer of high quality having controlled refractive index, a coating layer formed by using said application material, an antireflection coating using said coating layer, an antireflection film and image display to which said antireflection coating is applied. A coating layer formed from a coating composition comprising (1) rutile type titanium oxide coated with an inorganic compound decreasing or eliminating a photocatalyst activity and an organic compound and/or organometal compound having an anionic polar group, and having a primary particle size in the range from 0.01 to 0.1 $\mu$m, (2) a binder component having an ionizing radiation-curing property, (3) a dispersing agent having an anionic polar group, and (4) an organic solvent is suitable for forming a light transmission layer constituting a single-layer type or multi-layer type antireflection coating 17, partucularly, a middle refractive index layer 18, high refracive index layer 19 or hard coat layer 16 having high refractive index (FIG. 2).

52 Claims, 10 Drawing Sheets

FIG. 15

TABLE 1

| | DIRECTLY AFTER PREPARATION | | | AFTER LEFT AT ROOM TEMPERATURE | | |
|---|---|---|---|---|---|---|
| | HAZE | REFRACTIVE INDEX | LAYER STRENGTH | PRESENCE OF PRECIPITATION | HAZE | REFRACTIVE INDEX |
| EXAMPLE 1 | 1.4 | 1.83 | EXCELLENT | NONE | 1.4 | 1.83 |
| COMPARATIVE EXAMPLE 1 | 3.2 | 1.80 | POOR | LARGE AMOUNT | — | — |
| COMPARATIVE EXAMPLE 2-1 | — | — | — | — | — | — |
| COMPARATIVE EXAMPLE 2-2 | 1.4 | 1.76 | POOR | NONE | 1.4 | 1.76 |
| COMPARATIVE EXAMPLE 3 | — | — | — | — | — | — |
| SUBSTRATE ONLY | 1.4 | — | — | — | — | — |

FIG. 16

TABLE 2

| | CELLOPHANE TAPE CROSS CUT PEELING TEST |
|---|---|
| EXAMPLE 1 | NO PEELING |
| COMPARATIVE EXAMPLE 2-2 | WHOLE SURFACE PEELING |

FIG. 17

TABLE 3

| EXAMPLE NO. | SUBSTRATE | HARD COAT LAYER TYPE | REFRACTIVE INDEX | | | OTHER |
|---|---|---|---|---|---|---|
| | | | MIDDLE REFRACTIVE INDEX LAYER | HIGH REFRACTIVE INDEX LAYER | LOW REFRACTIVE INDEX LAYER | |
| 2 | PET | CLEAR: *REFRACTIVE INDEX: 1.52 | 1.76 | 1.90 | 1.42 | — |
| 3 | TAC | CLEAR: *REFRACTIVE INDEX: 1.51 | — | 1.76 | 1.42 | — |
| 4 | SAME AS ABOVE | MAT: *STYRENE BEAD, *PARTICLE SIZE: 3.5 μM, *REFRACTIVE INDEX: 1.52 | — | 1.76 | 1.42 | TRANSPARENT CONDUCTIVE LAYER BETWEEN SUBSTRATE/HC |
| 5 | SAME AS ABOVE | SAME AS ABOVE *ANISOTROPIC CONDUCTIVITY | — | 1.76 | 1.42 | — |
| 6 | SAME AS ABOVE | HIGH REFRACTIVE INDEX CLEAR TYPE: *REFRACTIVE INDEX: 1.70 | — | 1.84 | 1.42 | — |
| 7 | SAME AS ABOVE | HIGH REFRACTIVE INDEX MAT TYPE: *ACRYL BEAD, *PARTICLE SIZE: 3.5 μM, *REFRACTIVE INDEX: 1.66 | — | — | 1.40 | — |
| 8 | SAME AS ABOVE | SAME AS ABOVE | — | 1.84 | 1.45 | STAIN-PROOFING LAYER |
| 9 | SAME AS ABOVE | SAME AS ABOVE | — | 1.90 (SPUTTERING) | 1.47 (SPUTTERING) | STAIN-PROOFING LAYER |
| 10 | PET | CLEAR: *REFRACTIVE INDEX: 1.52 | 1.76 | 1.90 (SPUTTERING) | 1.47 (SPUTTERING) | TRANSPARENT CONDUCTIVE LAYER BETWEEN SUBSTRATE/HC |
| 11 | SAME AS ABOVE | CLEAR: *REFRACTIVE INDEX: 1.52 | 1.76 | — | — | TRANSPARENT CONDUCTIVE LAYER BETWEEN SUBSTRATE/HC |
| 12 | TAC | ANISOTROPIC CONDUCTIVE HIGH REFRACTIVE INDEX MAT: *ACRYL BEAD, *PARTICLE SIZE: 3.5 μM, *REFRACTIVE INDEX: 1.66 *GOLD, NICKEL-TREATED ORGANIC BEAD | — | — | 1.42 | — |

FIG. 18

TABLE 4

| EXAMPLE | REFLECTANCE | PENCIL HARDNESS | ADHESIVE PROPERTY (PEELED SQUARE NUMBER /ALL SQUARE NUMBER) | APPLICATION FLECK |
|---|---|---|---|---|
| 2 | 0.4-0.7% (450-650nm) | 3H | 100/100 | NONE |
| 3 | 0.4% (550nm) | 2H | 100/100 | NONE |
| 4 | 0.6% (550nm) | 2H | 100/100 | NONE |
| 5 | 0.6% (550nm) | 2H | 100/100 | NONE |
| 6 | 0.2% (550nm) | 2H | 100/100 | NONE |
| 7 | 0.8% (550nm) | 2H | 100/100 | NONE |
| 8 | 0.5% (550nm) | 2H | 100/100 | NONE |
| 9 | 1.2% (550nm) | 3H | 100/100 | NONE |
| 10 | 0.3-1.2% (450-650nm) | 3H | 100/100 | NONE |
| 11 | 0.3-1.2% (450-650nm) | 3H | 100/100 | NONE |
| 12 | 0.8% (550nm) | 2H | 100/100 | NONE |

COATING COMPOSITION, IT'S COATING LAYER, ANTIREFLECTION COATING, ANTIREFLECTION FILM, IMAGE DISPLAY AND INTERMEDIATE PRODUCT

CROSS REFERENCE TO RELATED APPLICATION

This application claims the priority of Japanese patent application Serial No's. 2001-006325, filed on Jan. 15, 2001, 2001-220330, filed on Jul. 19, 2001 and 2001-220332, filed on Jul. 19, 2001.

TECHNICAL FIELD

The present invention relates to a coating composition excellent in dispersibility, dispersion stability and coating aptitude, and an optical thin layer formed by using this coating composition. More specifically, the present invention relates to a coating composition suitable for forming an optical thin layer having controlled refractive index, typically, a layer constituting an antireflection coating with which the surface of a display such as LCD, CRT and the like is coated, particularly, a high refractive index hard coat layer having an function as a supporting layer for a middle to high refractive index layer and a function as a high refractive index layer, together, and a middle to high refractive index layer having excellent adhesive property with adjacent layers such as vapor deposition layer and the like.

Further, the present invention relates also to an antireflection coating having a coating layer formed by using the above-mentioned coating composition, and an antireflection film and an image display to which such an antireflection coating is applied.

BACKGROUND ART

The display surface of an image display such as liquid crystal displays (LCD), cathode ray tube display apparatus (CRT) and the like is required to manifest little reflection of beam emitted from an outer light source such as a fluorescent lamp and the like in order to improve visibility.

A phenomenon is conventionally known in which reflection factor decreases by coating the surface of a transparent body with a transparent layer having small reflection factor, and it is possible to improve visibility by providing an antireflection coating utilizing such a phenomenon on the display surface of an image display. The antireflection coating has a layer structure in which, for the purpose of securing sufficient hardness, a hard coat layer is provided on a substrate, and on this is provided a low refractive index layer having smaller refractive index than that of the hard coat layer, to make the refractive index of the outermost surface smaller, or a layer structure in which, for further improving the antireflection effect, one or more middle to high refractive index layers are provided on the above-mentioned hard coat layer, and a low refractive index layer is provided on the middle to high refractive index layer, to make the refractive index of the outermost surface smaller.

A high refractive index layer or middle refractive index layer in such an antireflection coating are required to have optical properties such as refractive index, transparency and the like by which a sufficient effect can be manifested when made into an antireflection coating, and physical properties such as adhesive property with adjacent other layers (hard coat layer, low refractive index layer), scratch resistance and the like.

Methods of forming a high refractive index layer or middle refractive index layer in an antireflection coating are in general classified roughly into gas phase methods and application methods, and the gas phase methods include physical methods such as a vacuum deposition method, sputtering method and the like, and chemical methods such as a CVD method and the like, and the application methods include a roll coat method, gravure coat method, slide coat method, spray method, immersion method and screen printing method, and the like.

In the case of the gas phase method, it is possible to form a high refractive index layer and a middle refractive index layer having high functions and high quality, however, there are problems that precise control of atmosphere in a high vacuum system is necessary, a special heating apparatus or ion generating-accelerating apparatus is necessary, and for this reason, a production apparatus is complicated and its size increases, leading necessarily to increase in production cost. Further, it is difficult to enlarge the area of a thin layer of a high refractive index layer and middle refractive index layer or to form a thin layer having uniform thickness on the surface of a film having complicated form.

On the other hand, in the case of the spray method among application methods, there are problems that an efficiency to utilize a coating liquid is poor, and control of layer forming conditions is difficult, and the like. In the case of a roll coat method, gravure coat method, slide coat method, immersion method, screen printing method and the like, an efficiency to utilize layer formation raw materials is good, and merits are present in large scale production and equipment cost, however, there is generally a problem that a high refractive index layer and middle refractive index layer obtained by an application method are poor in functions and quality in comparison with those obtained by a gas phase method.

Recently, as an application method capable of forming a thin layer of a high refractive index layer and a middle refractive index layer having excellent quality, a method is suggested in which a coating liquid prepared by dispersing fine particles with high refractive index such as titanium oxide, tin oxide and the like in a solution of a binder composed of an organic substance is applied on a substrate, to form a coating layer.

Since it is essential that a coating layer forming a middle to high refractive index layer is transparent in the visible light region, it is necessary that, as high refractive index fine particles, so-called ultra-fine particles having a primary particle size of not larger than the wavelength of visible beam are used, and the above-mentioned high refractive index fine particles are uniformly dispersed in a coating liquid and a coating layer. However, in general, when the particle size of fine particles decreases, the surface area of fine particles increases, and aggregation force between particles increases. When solid components of a coating liquid aggregate, haze of the resulting coating layer deteriorates. Accordingly, a coating liquid for forming a thin layer of a high refractive index layer and a middle refractive index layer is required to have sufficient dispersibility to form an uniform coating layer showing small haze. Further, the coating liquid is required to have sufficient dispersion stability so that it can be stored easily for a long period of time.

A problem of aggregation of ultra-fine particles can be solved by use of a dispersing agent showing excellent dispersibility for the ultra-fine particles. A dispersing agent adsorbs on the surface of a fine particle while permeating between fine particles to be aggregated, and enables uniform dispersion of fine particles in a solvent while relaxing aggregated state in a process of dispersion treatment. However, since ultra-fine particles have increases surface area, a large amount of dispersing agent is necessary for dispersing ultra-fine particles uniformly in a coating liquid and for stabilizing ultra-fine particles so that they can stand storage for a long period of time. When a large amount dispersing agent is mixed in a coating liquid, the dispersing agent is present in large amount also in a coating layer formed using the above-mentioned coating liquid, and the dispersing agent prevents curing of binder components, and significantly lowers the strength of the coating layer.

Further, a coating liquid is required to have such application aptitude that it can be applied uniformly and thinly so as to easily form a thin layer with large area from the standpoint of mass production, and drying unevenness does not occur.

The middle to high refractive index layer is required to have sufficient adhesive property with a hard coat layer and a low refractive index layer respectively adjacent to the middle to high refractive index layer. When a low refractive index layer such as a silicon oxide (SiOx) layer and the like is formed by a so-called dry coating method such as a vapor deposition method and the like on a middle to high refractive index layer formed from a coating liquid by a so-called wet method, adhesive property is extremely deficient and releasing occurs easily, therefore, particularly excellent adhesive property is required.

The hard coat layer has originally plays a role as a supporting layer for a middle to high refractive index layer in order to for prevent scratching of an antireflection coating, and in the case of obtaining a high refractive index hard coat layer having simultaneously a function as a middle to high refractive index layer by compounding high refractive index fine particles in this hard coat layer, the constituent layer number of an antireflection coating can be reduced. However, while the middle to high refractive index layer has a thickness of from about 5 to 200 nm, preferably from about 50 to 160 nm, the hard coat layer is formed so as to have fairly large thickness of from about 0.2 to 20 $\mu$m, preferably from about 1 to 10 $\mu$m, further preferably from about 2 to 5 $\mu$m for the original purpose of securing sufficient hardness, therefore, when a high refractive index hard coat layer is formed by a wet method using the same coating liquid as that for the middle to high refractive index layer, there is a tendency of causing deterioration in transparency due to aggregation of high refractive index fine particles further than in the case of forming a middle to high refractive index layer by a wet method. Additionally, though the hard coat layer is required to have high hardness, a dispersing agent has a nature of preventing curing of a binder of a coating layer as described above, therefore, the amount of a dispersing agent which can be mixed in a coating liquid for a hard coat layer is limited further than in the case of a coating liquid for a middle to high refractive index layer. Consequently, a requirement for reduction of a dispersing agent in a coating liquid for a high refractive index hard coat layer is further severer than that for a coating liquid for a middle to high refractive index layer.

DISCLOSURE OF INVENTION

The present invention has been accomplished in view of the above-mentioned circumstances, and a first object thereof is to provide a coating composition excellent in dispersibility and dispersion stability, capable of forming a coating layer showing little haze and having excellent storability.

A second object of the present invention is to provide a coating composition excellent also in application aptitude together with dispersibility and dispersion stability, and capable of forming a thin layer having large area.

A third object of the present invention is to provide a coating composition which, after formation of a coating layer, can obtain sufficient coating layer strength by curing of a binder component.

A fourth object of the present invention is to provide a coating composition which can give a coating layer manifesting sufficient adhesive property to adjacent layers, particularly, a vapor-deposited layer.

A fifth object of the present invention is to provide a coating layer which can be utilized as a high quality optical thin layer manifesting controlled refractive index and suitable particularly for forming at least one layer of an antireflection coating, using a coating composition which can attain at least one of the above-mentioned first to fourth objects.

A sixth object of the present invention is to provide a high quality antireflection coating produced by laminating a light transmission layer excellent in various properties such as transparency, layer strength, adhesive property with adjacent layers, uniformity in layer thickness and the like.

A seventh object of the present invention is to provide a high quality antireflection coating provided with a high refractive index layer and/or middle refractive index layer excellent in various properties such as transparency, layer strength, adhesive property with adjacent layers, uniformity in layer thickness and the like, and also having sufficiently high refractive index, simultaneously.

An eighth object of the present invention is to provide a high quality antireflection coating comprising a high refractive index hard coat layer which, when formed as a ground layer for a middle to high refractive index layer and low refractive index layer, is excellent in various properties such as hardness, transparency, adhesive property with adjacent layers, uniformity in layer thickness and the like, can function as a hard coat layer improving the hardness of a reflection layer, and has high refractive index capable of functioning also as a middle to high refractive index layer.

A ninth object of the present invention is to provide an antireflection film and an image display obtained by mounting an antireflection coating capable of attaining the above-mentioned objects.

The present invention solves at least one of these objects.

The present invention solving the above-mentioned objects is constituted based on the following basic principle.

A. Coating Composition of the Present Invention

The coating composition of the present invention for solving the above-mentioned objects comprises, at least, (1) rutile type titanium oxide coated with an inorganic compound decreasing or eliminating a photocatalyst activity and an organic compound and/or organometal compound having an anionic polar group, and having a primary particle size in the range from 0.01 to 0.1 $\mu$m, (2) a binder component having an ionizing radiation-curing property, (3) a dispersing agent having an anionic polar group, and (4) an organic solvent.

The coating composition of the present invention can easily control the refractive index of a coating layer since the composition comprises ritile type titanium oxide having high refractive index. In the coating composition of the present invention, a dispersing agent having an anionic polar group is mixed with the titanium oxide, for dispersing the titanium oxide uniformly and stably. Further, in the coating composition of the present invention, the titanium oxide is coated with an inorganic compound, and additionally, coated with an organic compound and/or organometal compound having an anionic polar group. By surface-treating the titanium oxide with an organic compound or organometal compound to impart affinity to a binder component and the like, dispersibility of the titanium oxide in a coating liquid can be further improved.

Therefore, the above-mentioned coating composition can sufficiently disperse ultra-fine particles of titanium oxide having high refractive index, and has excellent dispersion stability so that it can suppress the use amount of a dispersing agent low, consequently, by applying this coating composition on an application surface and curing the composition by irradiation with ionization radiation, high refractive index and transparency necessary for optical members such as an antireflection coating and the like are obtained, and simultaneously, sufficient coating layer strength and adhesive property with adjacent layers can be obtained.

Namely, the coating composition of the present invention manifests excellent dispersibility and dispersion stability of titanium oxide, owing to compounding of a dispersing agent having an anionic polar group and because of coating with an organic compound and/or organometal compound having an anionic polar group, and thereby can form a transparent layer having controlled refractive index, showing little haze, further, having excellent layer strength and adhesive property with adjacent layers.

Further, the coating composition of the present invention also has long pot life. Furthermore, the coating composition of the present invention is excellent also in application aptitude, and can easily form an uniform thin layer having large area.

Still further, in the present invention, the photocatalyst activity of titanium oxide is decreased or eliminated by surface treatment with an inorganic compound, therefore, decrease in strength of a coating layer due to deterioration of a binder component, and yellowing phenomenon causing decrease in an antireflection ability, do not occur easily.

Particularly, the above-mentioned coating composition is suitable for forming a middle refractive index layer, high refractive index layer or high refractive index hard coat layer, in view of the range of refractive index which can be controlled by changing the compounding amount of titanium oxide.

Therefore, according to the present invention, a high quality antireflection coating which comprises a high refractive index layer and/or middle refractive index layer excellent in various properties such as transparency, layer strength, adhesive property with adjacent layers, uniformity in layer thickness and the like, and also has sufficiently high refractive index, simultaneously is provided.

Further, according to the present invention, a high quality antireflection coating comprising a high refractive index hard coat layer which, when formed as a ground layer for a middle to high refractive index layer and low refractive index layer, is excellent in various properties such as hardness, transparency, adhesive property with adjacent layers, uniformity in layer thickness and the like to function as a hard coat layer improving the hardness of the reflection coating, and has high refractive index capable of functioning also as a middle to high refractive index layer is provided.

In this case, the surface of the above-mentioned high refractive index hard coat layer may be shaped into fine irregular form, to give a hard coat layer functioning as an anti-glare layer.

As the above-mentioned inorganic compound coating titanium oxide, suitably used are compounds selected from the group consisting of alumina, silica, zinc oxide, zirconium oxide, tin oxide, tin oxide doped with antimony (ATO), indium oxide doped with tin (ITO), indium oxide doped with zinc (IZO), zinc oxide doped with aluminum (AZO) and tin oxide doped with fluorine (FTO).

As the above-mentioned dispersing agent having an anionic polar group, suitably used are compounds having a molecule structure in which a side chain composed of an anionic polar group or a side chain having an anionic polar group is bonded to a principal chain having a skeleton of an ethylene oxide chain, and having a number-average molecular weight of 2000 to 20000.

As the ionizing radiation-curable binder component, it is preferable to use a binder component having an anionic polar group. The binder component having an anionic polar group shows high affinity with the titanium oxide and acts as a dispersing aid, consequently, improves dispersibility of the titanium oxide in the coating composition and coating layer, and performs an effect of reducing the use amount of a dispersing agent, thus preferable. The dispersing agent does not function as a binder, therefore, decreasing the mixing ratio of a dispersing agent can realize improved coating layer strength.

As the above-mentioned binder component, those remaining a hydroxyl group in the molecule are preferably used. Since a hydroxyl group is an anionic polar group and manifests high affinity to titanium oxide, a binder component having a hydroxyl group acts as a dispersing aid and can decrease the compounding amount of the above-mentioned dispersing agent.

As the binder component, those having a hydrogen bond-forming group as the anionic polar group are particularly preferable. When the binder component has a hydrogen bond-forming group, it is possible to improve mutual adhesive property between adjacent layers such as a hard coat layer, middle refractive index layer, high refractive index layer, low refractive index layer, transparent conductive layer and the like due to hydrogen bond, in addition to improvement in the dispersibility of the titanium oxide due to an effect as an anionic polar group.

Particularly, when a middle to high refractive index layer is formed using a coating composition in which a binder component having a hydrogen bond-forming group is mixed, it is possible to form a vapor-deposited layer showing high adhesive property, for example, a silicon oxide (SiOx) vapor-deposited layer, on the middle to high refractive index layer, this being very useful.

As the binder component having a hydrogen bond-forming group, binder components having a hydroxyl group in the molecule can be specifically used. Suitably used as the binder component having a hydroxyl group in the molecule are pentaerythritol poly-functional acrylates, dipentaerythritol poly-functional acrylates, pentaerythritol poly-functional methacrylates or dipentaerythritol poly-functional methacrylates. In these compounds, an original hydroxyl group in pentaerythritol or dipentaerythritol remains in the molecule.

When the middle to high refractive index layer or high refractive index hard coat layer of the present invention contains a hydrogen bond-forming group and, simultaneously, also the adjacent layers contain a hydrogen bond-forming group, particularly excellent adhesive property is obtained.

As the adjacent layer containing a hydrogen bond-forming group, a titanium oxide (TiOx) layer as the middle to high refractive index layer is sometimes formed by sputtering, the dry coating method. As the low refractive index layer, a silicon oxide (SiOx) layer is sometimes formed by vapor deposition of the dry coating method or sol gel reaction of the wet method. In some cases, a transparent conductive layer is formed by the wet method using a coating composition containing a binder component having a hydrogen bond-forming group and a conductive material such as ATO, ITO and the like. Further, an ATO vapor-deposited layer or ITO vapor-deposited layer as the transparent conductive layer is formed sometimes by the dry coating method.

Conventionally, when a titanium oxide layer or silicon oxide layer is formed by the dry coating method on a middle to high refractive index layer formed by the wet method, sufficient adhesive property is not obtained, and a layer is easily peeled. In contrast, according to the present invention, by forming a middle to high refractive index layer or high refractive index hard coat layer by the wet method using a coating composition in which a binder component having a hydrogen bond-forming group is mixed, layer can be formed with excellent adhesive property by the dry coating method on this middle to high refractive index layer, this being very useful.

When a preferable binder component having an anionic polar group such as a hydrogen bond-forming group is used, specifically, the above-mentioned binder component can be mixed in a ratio of 4 to 20 parts by weight and a dispersing agent having an anionic polar group can be mixed in a ratio of 2 to 4 parts by weight based on 10 parts by weight of the titanium oxide. This mixing ratio is particularly suitable for a coating composition for a middle to high refractive index layer.

A coating composition containing the above-mentioned binder component having an anionic polar group in the molecule in a ratio of 4 to 40 parts by weight and a dispersing agent in a ratio of 2 to 10 parts by weight based on 10 to 20 parts by weight of the titanium oxide is particularly suitable for forming a high refractive index hard coat layer.

As the above-mentioned organic compound coating the titanium oxide, organic carboxylic acids are suitably used. As the above-mentioned organometal compound coating the titanium oxide, a silane coupling agent and/or titanate coupling agent is suitably used.

As the above-mentioned organic solvent, ketone-based solvents are suitably used. If the coating composition of the present invention is prepared using a ketone-based solvent, the composition can be easily applied uniformly and thinly on the surface of a substrate and after application, the evaporation rate of a solvent is appropriate, and drying unevenness is not caused easily, consequently, a coating layer with large area having uniform thickness can be obtained easily.

In some cases, the surface of a hard coat layer which is a supporting layer for an antireflection coating is shaped into fine irregularity, to impart a function as an anti-glare layer. When the coating composition of the present invention is prepared using a ketone-based solvent, the composition can be uniformly applied also on the surface of such fine irregularity, and application unevenness can be prevented.

Further, the above-mentioned coating composition can form an uniform antireflection coating even on a hard coat layer having a clear surface on which interference color fleck is liable to be observed very easily, without causing application mottling, namely, extremely excellent in application aptitude. Also, the composition can form a layer showing no application mottling even on a mat hard coat layer having a fine irregular surface.

The coating composition of the present invention may contain 1-hydroxy-cyclohexyl-phenyl-ketone, and/or 2-methy-1[4-(methylthio)phenyl]-2-morpholinopropan-1-one, as a photo-initiator.

Regarding the ratio of the organic solvent, it is preferable to compound the above-mentioned organic solvent in a ratio of 50 to 99.5 parts by weight to 0.5 to 50 parts by weight of the total weight of all solid components in the coating composition of the present invention when the total amount of solid components and the organic solvent in the coating composition of the present invention is 100 parts by weight. When the use amount of the organic solvent lies within this range, a coating composition excellent particularly in dispersion stability and suitable for storage for a long period of time is obtained.

B. Coating Layer of the Present Invention

The coating layer of the present invention is obtainable by applying the above-mentioned coating composition of the present invention on the surface of an application body and curing this. In the coating layer after curing, rutile type titanium oxide coated with an inorganic compound decreasing or eliminating a photocatalyst activity and an organic compound and/or organometal compound having an anionic polar group, and having a primary particle size in the range from 0.01 to 0.1 $\mu$m, and a dispersing agent having an anionic polar group, are uniformly mixed in a cured binder.

This coating layer has high transparency, shows little haze and can be endowed with refractive index controllable by controlling the compounding amount of the titanium oxide, therefore, this layer can be utilized suitably in one or more light transmittance layers constituting an antireflection coating, for example, a middle to high refractive index layer or a high refractive index hard coat layer.

When a binder in this coating layer has a hydrogen bond-forming group, adhesive property with adjacent layers, particularly with a vapor-deposited layer is excellent.

According to the present invention, it is possible that, when a layer having a layer thickness of 0.05 to 0.2 $\mu$m after curing is formed, the refractive index is controlled in the range from 1.55 to 2.30, and a haze value measured under condition of integration with a substrate according to JIS-K 7361-1 is controlled to the same value as in the case of using only the above-mentioned substrate or suppressed so that a difference from the haze value in the case of using only the above-mentioned substrate is within 1%, thus a middle to high refractive index layer can be formed.

Further, according to the present invention, it is possible that, when a layer having a layer thickness of 0.2 to 20 $\mu$m after curing is formed, the refractive index is controlled in the range from 1.55 to 2.30, and a haze value according to JIS-K 7361-1 is controlled to the same value as in the case of using only the above-mentioned substrate or suppressed so that a difference from the haze value in the case of using only the above-mentioned substrate is within 10%, thus a high refractive index hard coat layer can also be formed.

C. Antireflection Coating of the Present Invention

An antireflection coating of the present invention is characterized in that it comprises a single layer structure composed of one light transmission layer having light transmitting ability or a multi-layer structure having lamination of two or more light transmission layers having light transmitting ability and mutually different refractive indices, wherein at least one of the above-mentioned light transmission layers is a cured layer in which rutile type titanium oxide coated with an inorganic compound decreasing or eliminating a photocatalyst activity and an organic compound and/or organometal compound having an anionic polar group, and having a primary particle size in the range from 0.01 to 0.1 μm, and a dispersing agent having an anionic polar group, are uniformly mixed in the cured binder.

D. Antireflection Film of the Present Invention

An antireflection film of the present invention is characterized in that the above-mentioned antireflection coating is laminated on at least one surface of a substrate film having light transmitting ability so that a low refractive index layer of the antireflection coating is situated on the appreciation surface side.

E. Image Display of the Present Invention

An image display of the present invention is characterized in that a display surface is coated with the above-mentioned antireflection coating so that a low refractive index layer of the antireflection coating is situated on the appreciation surface side.

BRIEF DESCRIPTION OF DRAWINGS

FIG. 15 is a table summarizing results of examples.

FIG. 16 is a table summarizing results of examples.

FIG. 17 is a table summarizing results of examples.

FIG. 18 is a table summarizing results of examples.

Figure 1:
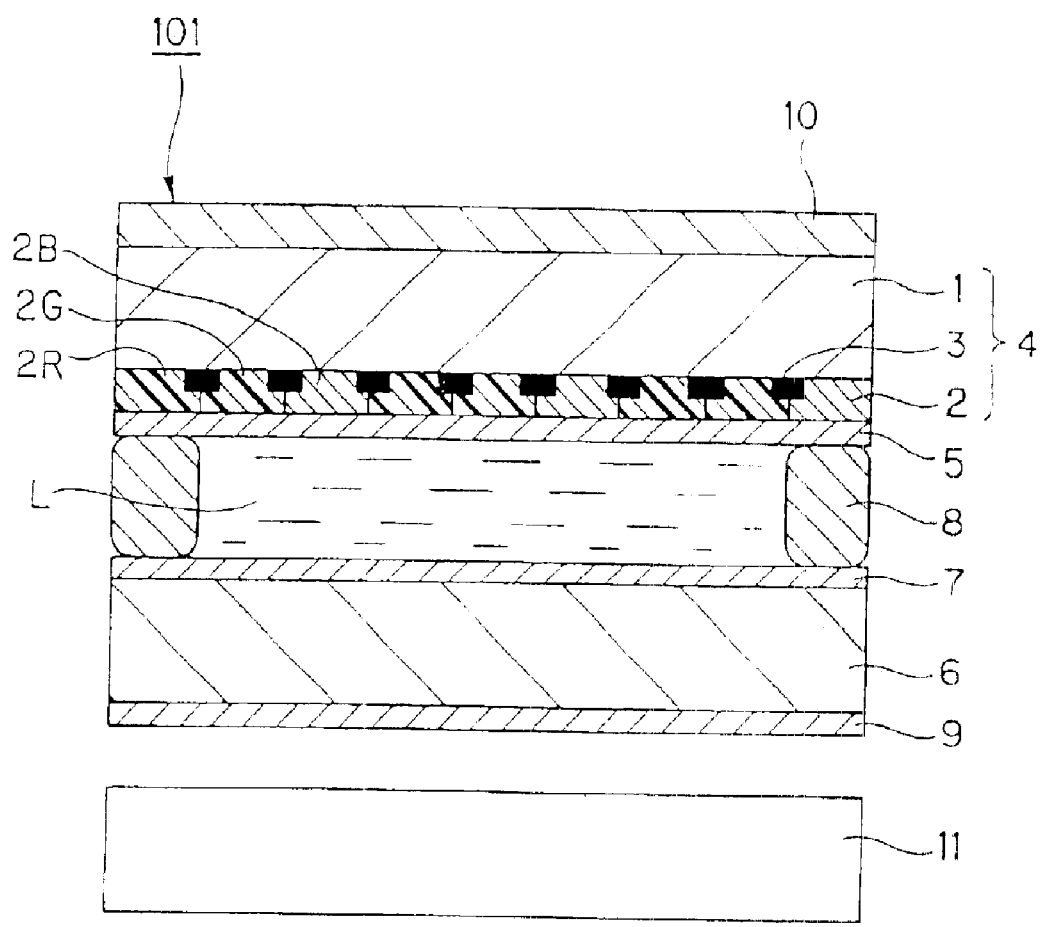
FIG. 1 is a view showing one example of a liquid crystal display, a display surface of which is coated with a multi-layer type antireflection coating containing the coating layer of the present invention, and showing its section schematically.

Marks in drawings represent the following meanings.

101: liquid crystal display
102: antireflection film
1: glass substrate of display surface side
2: pixel part
3: black matrix layer
4: color filter
5 and 7: transparent electrode layer
6: glass substrate on rear surface side
8: seal material
9: orientation layer
10: polarization film
11: back light unit
12: polarization element
13 and 14: protective film
15: adhesive layer
16: hard coat layer
17: multi-layer type antireflection coating
18: middle refractive index layer
19: high refractive index layer
20: low refractive index layer
21: substrate film
22: high refractive index layer
23: low refractive index layer
24: substrate film
25: clear hard coat layer
26: middle refractive index layer
27: high refractive index layer
28: low refractive index layer
29: mat hard coat layer
30: filler
31: transparent conductive layer
32: high refractive index clear hard coat layer
33: high refractive index mat hard coat layer
34: stain-proofing layer

BEST MODES FOR CARRYING OUT INVENTION

The present invention will be illustrated in detail below. A coating composition of the present invention is an application material comprising at least the following essential components:

(1) rutile type titanium oxide coated with an inorganic compound decreasing or eliminating a photocatalyst activity and an organic compound and/or organometal compound having an anionic polar group, and having a primary particle size in the range from 0.01 to 0.1 μm, (2) a binder component having an ionizing radiation-curing property, (3) a dispersing agent having an anionic polar group, and (4) an organic solvent, and if necessary, the composition may contain other components.

An application method using this coating composition can efficiently form optical thin layers having controlled refractive index, typically, various light transmission layers constituting an antireflection coating, among them, particularly light transmission layers required to have high refractive index such as middle to high refractive index layers and high refractive index hard coat layers and the like.

Titanium oxide among the above-mentioned essential components is a main component for controlling the refractive index of a coating layer formed by using the coating composition of the present invention to a given value. Titanium oxide is suitable as a component for controlling refractive index since it has high refractive index and is colorless or scarcely colored. Titanium oxide includes rutile type titanium oxide, anatase type titanium oxide and amorphous type titanium oxide, and in the present invention, rutile type titanium oxide which has higher refractive index as compared with that of anatase type and amorphous type is used.

Titanium oxide of so-called ultra-fine particle size is used so as not to decrease transparency of a coating layer. Here, "ultra-fine particle" is generally a particle of sub-micron order, and means that having smaller particle size than that of a particle called "fine particle" having a particle size of several $\mu$m to dozens $\mu$m. Namely, in the present invention, titanium oxide used has a primary particle size of 0.01 $\mu$m or more and 0.1 $\mu$m or less, preferably 0.03 $\mu$m or less. That having an average particle size of less than 0.01 $\mu$m cannot be dispersed easily in a coating composition, consequently, a coating layer in which titanium oxide ultra-fine particles are uniformly dispersed is not obtained. That having an average particle size of over 0.1 $\mu$m is not preferable since transparency of a coating layer is lost. The primary particle size of titanium oxide may be visually measured by a scanning electron microscope (SEM), or mechanically measured by a particle size distribution meter and the like utilizing a dynamic light scattering method, static light scattering method or the like.

When the primary particle size of titanium oxide ultra-fine particles is within the above-mentioned range, they can be used in the present invention even if the particle is in the form of sphere, needle or other any shape.

Since titanium oxide has a photocatalyst activity, if a coating layer is formed using a coating liquid containing titanium oxide on which surface treatment is not conducted at all, chemical bond between binders forming a coating layer tends to be cut by a photocatalyst action to decrease the coating layer strength, or the coating layer tends to yellow to deteriorate transparency and haze of the coating layer. Therefore, the surface of titanium oxide is coated with an inorganic compound decreasing or eliminating a photocatalyst activity. As such an inorganic compound, for example, metal oxides such as alumina, silica, zinc oxide, zirconium oxide and the like, conductive complex metal oxides such as tin oxide doped with antimony (ATO), indium oxide doped with tin (ITO), indium oxide doped with zinc (IZO), zinc oxide doped with aluminum (AZO), tin oxide doped with fluorine (FTO) and the like, are exemplified. These can be used singly or in combination of two or more.

When the surface of a titanium oxide fine particle is coated with an inorganic compound, a desired inorganic compound is physico-chemically adsorbed on the surface of a titanium oxide fine particle by adding a salt of an inorganic compound to be coated or an organometal compound capable of generating an inorganic compound to be coated by hydrolysis into a dispersion prepared by dispersing titanium oxide fine particles in water and changing pH and/or temperature condition.

Titanium oxide coated with an inorganic compound is found also in commercially available products, and for example, titanium oxide coated with alumina is available from Ishihara Sangyo Corporation under trade name of TTO51(A).

The surface of titanium oxide is coated with an inorganic compound for decreasing or eliminating a photocatalyst activity and simultaneously coated with an organic compound or organometal compound for enhancing dispersibility in an organic solvent. In the coating composition of the present invention, a dispersing agent having an anionic polar group is mixed as described later for dispersing titanium oxide, and dispersibility of titanium oxide in a coating liquid can be further improved by surface-treating titanium oxide with an organic compound or organometal compound to impart hydrophobicity. Since an anionic polar group has high affinity with titanium oxide, titanium oxide is coated with an organic compound having an anionic polar group and/or an organometal compound having an anionic polar group, in the present invention.

As the organic compound having an anionic polar group, those having an anionic polar group such as a carboxyl group, phosphate group or hydroxyl group can be used, and examples thereof include stearic acid, lauric acid, oleic acid, linolic acid, linoleic acid, pentaerythritol triacrylate, dipentaerythritol pentaacrylate, EO (ethylene oxide)-modified phosphoric acid triacrylate, ECH-modified glycerol triacrylate, and the like.

As the organometal compound having an anionic polar group, silane coupling agents and/or titanate coupling agents can be used.

As the silane coupling agent, specifically exemplified are 3-glycidoxypropyltrimethoxysilane, 3-glycidoxypropylmethyldimethoxysilane, 2-(3,4-epoxycyclohexyl) ethyltrimethoxysilane, 3-aminopropyltriethoxysilane, 3-aminopropyltrimethoxysilane, N-(2-aminoethyl)3-aminopropylmethyldiethoxysilane, 3-mercaptopropyltrimethoxysilane, vinyltrimethoxysilane, vinyltriethoxysilane, vinyltris(2-methoxyethoxy)silane, 3-methacryloxypropyltrimethoxysilane and the like.

As the titanate coupling agent, specifically exemplified are PlaneAct KR-TTS, KR-46B, KR-55, KR-41B, KR-38S, KR-138S, KR-238S, 338X, KR-44, KR-9SA, KR-ET and the like: product names, marketed from Ajinomoto Co., Inc., and further, metal alkoxides such as tetramethoxytitanium, tetraethoxytitanium, tetraisopropoxytitanium, tetra n-propoxytitanium, tetra n-butoxytitanium, tetra sec-butoxytitanium, tetra tert-butoxytitanium and the like can also be used.

As the organic compound and/or organometal compound treating the surface of titanium oxide, particularly, coupling agents and organic carboxylic acids are preferably used. When a coating composition is prepared by using a ketone-based solvent described later, it is preferable to use a coupling agent in combination with one or more of stearic acid, lauric acid, oleic acid, linolic acid and linoleic acid, and in this case, sufficient dispersibility is obtained.

For coating the surface of titanium oxide with an organic compound and/or organometal compound to impart hydrophobicity, an organic compound and/or organometal compound having an anionic polar group is dissolved in an organic solvent in advance, and titanium oxide on which surface treatment with an inorganic compound has been performed or not performed yet is dispersed into this solution, then the organic solvent is completely removed by evaporation, thereby attaining coating.

Titanium oxide coated with both an inorganic compound and an organic compound is found also in commercially available products, and for example, titanium oxide coated with alumina and stearic acid is available from Ishihara Sangyo Corporation under trade name of TTO51 (C).

The binder component having an ionizing radiation-curing property is mixed as an essential component in order to impart a layer forming property and adhesive property with a substrate and adjacent layers, to the coating composition of the present invention. The binder component having an ionizing radiation-curing property is present, in the form of a monomer or oligomer not polymerized, in a coating composition, therefore, the binder component gives excellent application aptitude of a coating composition, and tends to realize formation of an uniform thin layer having large area. Further, when a binder component in a coating layer is polymerized and cured after application, sufficient coating layer strength is obtained.

As the binder component having an ionizing radiation-curing property, a monomer or oligomer which has a functional group causing a polymerization reaction directly by irradiation of ionizing radiation such as ultraviolet ray and electron beam or indirectly by the action of an initiator can be used. In the present invention, a radical-polymerizable monomer and oligomer having an ethylenical double bond can be mainly used and the photo-initiator is used in combination therewith, as required. However, other binder components having an ionizing radiation-curing property can also be used, for example, photo-cation-polymerizable monomers and oligomers such as epoxy group-containing compounds may also be used. In the photo-cation-polymerizable binder component, a photo-cation-initiator is used in combination, if necessary. The monomer or oligomer as a binder component is preferably a poly-functional binder component having two or more polymerizable functional groups, so as to cause cross-linked bond between molecules of the binder component.

Specifically exemplified as the radical polymerizable monomer and oligomer having an ethylenic double bond are mono-functional (meth)acrylates such as 2-hydroxyethyl (meth)acrylate, 2-hydroxypropyl (meth)acrylate, hydroxybutyl acrylate, 2-hydroxy 3-phenoxypropyl acrylate, carboxy polycaprolactone acrylate, acrylic acid, methacrylic acid, acrylamide and the like; poly-functional (meth) acrylates such as diacrylates including pentaerythritol triacrylate, ethylene glycol diacrylate, pentaerythritol diacrylate monostearate and the like; tri(meth)acrylates such as trimethylolpropane triacrylate, pentaerythritol triacrylate and the like, pentaerythritol tetraacrylate derivatives and dipentaerythritol pentaacrylate and the like; and oligomers obtained by polymerization of these radical-polymerizable monomers. Here, "(meth)acrylate" means acrylate and/or methacrylate.

Of binder components having an ionizing radiation-curing property, a binder component having an anionic polar group has high affinity with titanium oxide and acts as a dispersion aid. Therefore, dispersibility of the titanium oxide in a coating composition and in a coating layer is improved, and an effect to decrease the use amount of a dispersing agent is also exhibited, thus preferable.

As the binder component, those having a hydrogen bond-forming group as the anionic polar group are particularly preferable. When the binder component has a hydrogen bond-forming group, dispersibility of titanium oxide is improved due to an effect as an anionic polar group, and additionally, adhesive property with adjacent layers such as a hard coat layer, low refractive index layer, middle refractive index layer, high refractive index layer, transparent conductive layer and the like can be improved by a hydrogen bond.

It is particularly preferable that a binder component in a light transmission layer containing the titanium oxide ultra-fine particles has a hydrogen bond-forming group and simultaneously adjacent layers such as a hard coat layer and the like also contain a hydrogen bond-forming group, since then adhesive property between both layers is further improved by a hydrogen bond.

For example, when a middle to high refractive index layer is formed using a coating composition in which a binder component having a hydrogen bond-forming group is mixed, excellent adhesive property is obtained also with a hard coat layer and a low, middle and high refractive index layer formed from a coating liquid by a so-called wet method (method of applying a coating liquid on a layer forming surface and drying and/or curing it), further, with low, middle and high refractive index layers formed by a so-called dry coating method (method of adhering a material in gas phase condition to a layer forming surface and depositing the material) such as vapor deposition method, sputtering and the like.

As the middle to high refractive index layer, a titanium oxide (TiOx) layer may be formed in some cases by sputtering of the dry coating method. Titanium oxide has an oxygen atom in the molecule, and can form a hydrogen bond. As the low refractive index layer, a silicon oxide (SiOx) layer may be formed in some cases by a vapor deposition method of the dry coating method or a sol gel reaction of the wet method. A silicon oxide layer contains a silanol group, and can form a hydrogen bond. A high refractive index hard coat layer using a binder component having a hydrogen bond-forming group shows particularly excellent adhesive property with a layer containing such a hydrogen bond-forming group.

Conventionally, when a titanium oxide layer or silicon oxide layer is formed by the dry coating method such as vapor deposition and the like on a middle to high refractive index layer formed by the wet method, sufficient adhesive property is not obtained, and the silicon oxide deposited layer tends to be peeled, in contrast, when a middle to high refractive index layer is formed by using a coating composition in which a binder component having a hydrogen bond-forming group has been mixed, the dry coating layer such as the silicon oxide (SiOx) deposited layer and the like can be formed with good adhesive property on the middle to high refractive index layer, meaning extreme usefulness.

Further, a transparent conductive layer such as an ITO deposited layer, ATO deposited layer and the like is provided by the wet method or dry coating method in an antireflection coating for the purpose of preventing electrification and a hard coat layer is formed on this transparent conductive layer, in some cases. As the hard coat layer, a hard coat layer having anisotropic conductivity, namely, in which volume resistivity along layer surface direction is higher than volume conductivity along layer thickness direction, may be formed. Also when such a hard coat layer having anisotropic conductivity or no anisotropic conductivity is formed, a high refractive index hard coat layer showing excellent adhesive property with a transparent conductive layer can be formed, by applying a coating composition in which a binder component having a hydrogen bond-forming group has been mixed, on a transparent conductive layer, giving extreme usefulness.

When a transparent conductive layer is formed by a wet method, a transparent conductive layer can also contain hydrogen bond-forming groups in large amount by forming the transparent conductive layer using a binder component having a hydrogen bond-forming group, obtaining particularly excellent adhesive property with a high refractive index hard coat layer containing a hydrogen bond-forming group.

As the binder component forming a transparent conductive layer, urethane acrylate resins having a hydroxyl group as a hydrogen bond-forming group are exemplified. When a transparent conductive layer is formed by a dry coating method, a metal oxide deposited layer such as an ITO deposited layer, ATO deposited layer and the like is obtained, and most of composition of the layer is occupied with a metal oxide having an oxygen atom, therefore, a hydrogen bond is formed easily, and sufficient adhesive property with a high refractive index hard coat layer containing a hydrogen bond-forming group is obtained. For forming a high refractive index hard coat layer having anisotropic conductivity, it may be recommendable that conductive fine particles for imparting an isotropic conductivity are mixed with a binder component having a hydrogen bond-forming group, into the coating composition for high refractive index hard coat layer of the present invention, and the composition is applied on a transparent conductive layer. As the conductive fine particle for imparting anisotropic conductivity, organic beads subjected to surface-treatment with gold and/or nickel are exemplified.

As the binder component having a hydrogen bond-forming group, binder components having a hydroxyl group in the molecule can be specifically used. As the binder component having a hydroxyl group in the molecule, pentaerythritol poly-functional (meth)acrylates or dipentaerythritol poly-functional (meth)acrylates containing a hydroxyl group remaining in the molecule can be used. Namely, in such binder components, two or more (meth)acrylic acid molecules are ester-bonded to one pentaerythritol or dipentaerythritol molecule, and part of hydroxyl groups originally present in the molecule of pentaerythritol or dipentaerythritol remain without being esterified, and for example, pentaerythritol triacrylate is mentioned. Pentaerythritol poly-functional acrylates and dipentaerythritol polyfunctional acrylates have two or more ethylenic double bonds in one molecule, therefore, they cause a cross-linking reaction in polymerization, obtaining high coating layer strength.

As the photo-initiator initiating radical polymerization, for example, acetophenones, benzophenones, ketals, anthraquinones, thioxanetones, azo compounds, peroxides, 2,3-dialkyldione compounds, disulfide compounds, thiuram compounds, fluoroamine compounds and the like are used. More specifically, 1-hydroxy-cyclohexyl-phenyl-ketone, 2-methyl-1[4-(methylthio)phenyl]-2-morpholinopropan-1-one, benzyldimethylketone, 1-(4-dodecylphenyl)-2-hydroxy-2-methylpropan-1-one, 2-hydroxy-2-methyl-1-phenylpropan-1-one, 1-(4-isopropylphenyl)-2-hydroxy-2-methylpropan-1-one, benzophenone and the like are exemplified, and of them, 1-hydroxy-cyclohexyl-phenyl-ketone and 2-methyl-1[4-(methylthio)phenyl]-2-morpholinopropan-1-one are preferably used in the present invention since they initiate and promote a polymerization reaction by irradiation with ionizing radiation even if used in small amount. Either one of them can be used singly or both of them can be used in combination. They are found also in commercially available products, and for example, 1-hydroxy-cyclohexyl-phenyl-ketone is available from Nippon Chiba Geigy under the trade name of Irgacure 184.

A dispersing agent having an anionic polar group has an anionic polar group showing high affinity with the titanium oxide, and mixed in the coating composition of the present invention in order to impart dispersibility of titanium oxide. As the anionic polar group, for example, a carboxyl group, phosphate group, hydroxyl group and the like are listed.

As the dispersing agent having an anionic polar group, specifically exemplified are products supplied under trade name of Disperbyk from BYK-Chemie Japan: namely, Disperbyk-111, Disperbyk-110, Disperbyk-116, Disperbyk-140, Disperbyk-161, Disperbyk-162, Disperbyk-163, Disperbyk-164, Disperbyk-170, Disperbyk-171, Disperbyk-174, Disperbyk-180, Disperbyk-182 and the like.

Of them, when a compound having a molecule structure in which a side chain composed of an anionic polar group or a side chain having an anionic polar group, as described above, is bonded to a principal chain having a skeleton of an ethylene oxide chain, and having a number-average molecular weight of 2000 to 20000 is used, particularly excellent dispersibility is obtained, thus preferable. The number-average molecular weight can be measured by a GPC (gel permeation chromatography) method. As the compound satisfying such conditions, Disperbyk-163 is mentioned among the above-mentioned Disperbyk series.

When a high refractive index hard coat layer is formed by using the above-mentioned coating composition, a mat material such as an organic fine particle and the like can be mixed in a coating composition and the composition can be applied to make fine irregularity on the surface of a high refractive index hard coat layer to impart a function as an anti-glare layer. Here, as the mat material for forming fine irregularity, specifically, styrene beads or acryl beads having an average particle size observed by SEM of about 0.5 to 10.0 μm, preferably about 1 to 10.0 μm can be used.

Further, fine irregularity can be formed on the surface of a high refractive index hard coat layer also by pressing a metal plate having preferable surface configuration or a PET film having a mat-like surface onto a coating layer of the coating composition to cause emboss processing, and photocuring the composition under this state, thereafter removing the plate or PET film.

The organic solvent for dissolving and dispersing solid component in the coating composition of the present invention is not particularly restricted, and various solvents can be used, for example, alcohols such as isopropyl alcohol, methanol, ethanol and the like; ketones such as methyl ethyl ketone, methyl isobutyl ketone, cyclohexanone and the like; esters such as ethyl acetate, butyl acetate and the like; halogenated hydrocarbons; aromatic hydrocarbons such as toluene, xylene and the like; or mixtures thereof.

In the present invention, ketone-based organic solvents are preferably used. When the coating composition of the present invention is prepared by using a ketone-based solvent, the composition can be easily applied on the surface of a substrate so as to give an uniformly thin layer, and evaporation speed of a solvent after application is suitable and drying unevenness is not caused easily, therefore, a coating layer with uniform thin and large area can be obtained easily.

For imparting a function as an anti-glare layer to a hard coat layer which is a supporting layer for an antireflection coating, fine irregularity is formed on the surface of the hard coat layer, and the coating composition of the present invention is applied on this to form a middle refractive index layer or a high refractive index layer, in some cases. When the coating composition of the present invention is prepared by using a ketone-based solvent, the composition can be uniformly applied even on the surface of such fine irregularity, and application irregularity can be prevented.

As the ketone-based solvent, a single solvent composed of one ketone, a mixed solvent composed of two or more ketones, and those containing other solvent together with one or more ketones and not lost as a nature as a ketone solvent, can be used. Preferably, a ketone-based solvent in which 70% by weight or more, particularly 80% by weight or more of the solvent is occupied by one or more ketones is used.

By using a ketone-based solvent as an organic solvent and coating the surface of titanium oxide with the above-mentioned organic compound and/or organometal compound, a coating composition excellent particularly in application aptitude is obtained, and an uniform thin layer with large area can be formed easily. Also in this case, it is further preferable to use, as the dispersing agent having an anionic polar group, an ethylene oxide-based dispersing agent as described above, namely, a compound having a molecule structure in which a side chain composed of an anionic polar group or a side chain having an anionic polar group is bonded to a principal chain having a skeleton of an ethylene oxide chain, and having a number-average molecular weight of 2000 to 20000. Alternatively, it is effective to use, as the binder component, a pentaerythritol polyfunctional (meth)acrylate or dipentaerythritol polyfunctional (meth)acrylate containing a hydroxyl group remaining in the molecule.

The coating composition of the present invention contains, as essential components, titanium oxide, a binder components having an ionizing radiation-curing property, a dispersing agent having an anionic polar group, and an organic solvent, and if necessary, a polymerization initiator for the binder components having an ionizing radiation-curing property, and other components may be further mixed. For example, if necessary, an ultraviolet shielding agent, ultraviolet absorber, surface adjusting agent (leveling agent), zirconium oxide, tin oxide (ATO) doped with antimony, and the like can be used.

The mixing ratio of each component can be appropriately controlled, and in general, the above-mentioned binder component is mixed in a ratio of 4 to 20 parts by weight and the dispersing agent having an anionic polar group is mixed in a ratio of 4 to 10 parts by weight based on 10 parts by weight of titanium oxide. However, when a binder component having an anionic polar group in the molecule is used, this binder component acts as a dispersion aid, therefore, the use amount of the dispersing agent having an anionic polar group can be significantly reduced. Since the dispersing agent does not function as a binder, coating layer strength can be improved by reducing the mixing ratio of the dispersing agent.

Specifically, the binder component having an anionic polar group can be mixed in a ratio of 4 to 20 parts by weight and the dispersing agent having an anionic polar group can be mixed in a ratio of 2 to 4 parts by weight based on 10 parts by weight of titanium oxide. This mixing ratio is particularly suitable for a coating composition for a middle to high refractive index layer.

A coating composition containing the above-mentioned binder component having an anionic polar group in the molecule in a ratio of 4 to 40 parts by weight and the dispersing agent in a ratio of 2 to 10 parts by weight based on 10–20 parts by weight of titanium oxide is particularly suitable for forming a high refractive index hard coat layer. Further, in this coating composition for a high refractive index hard coat layer, mat material particles such as organic fine particles and the like may be mixed, in a ratio of 1 to 20 parts by weight based on the former composition and in a ratio of 1 to 5 parts by weight based on the latter composition, for imparting a function as an anti-glare layer.

When a photo-polymerization initiator is used, the photo-polymerization initiator is mixed usually in a ratio of 3 to 8 parts by weight based on 100 parts by weight of a binder component.

The amount of the organic solvent is appropriately controlled so that each component can be uniformly dissolved and dispersed, aggregation does not occur in storage after preparation, and the concentration is not too dilute in application. It is preferable that a coating composition of high concentration is prepared with a solvent, use amount of which is decreased within the range in which this condition is satisfied, the composition is stored in a small volume space, and a portion of necessary amount is took up and diluted to concentration suitable for application work, in use. In the present invention, if the total amount of solid components and an organic solvent is 100 parts by weight, by using an organic solvent in a ratio of 50 to 95.5 parts by weight to 0.5 to 50 parts by weight of the total amount of all solid components including essential components and other components, further, preferably, by using an organic solvent in a ratio of 70 to 90 parts by weight to 10 to 30 parts by weight of the total amount of all solid components, a coating composition excellent particularly in dispersion stability and suitable for storage for a long period of time is obtained.

For preparing the coating composition of the present invention using the above-mentioned components, the components may be subjected to a dispersion process according to a general method for preparing a coating liquid. For example, a coating composition is obtained by mixing essential components and optional components in any order, adding a medium such as bead and the like to the resulted mixture, and subjecting the mixture to an appropriate dispersion process by means of a paint shaker, bead mill and the like.

Thus obtained coating composition comprises, as essential components, rutile type titanium oxide particles having given primary particle size and coated with an inorganic compound and an organic compound and/or organometal compound, a binder component having an ionizing radiation-curing property, and a dispersing agent having an anionic polar group, dissolved and dispersed in an organic solvent, and particularly, the titanium oxide particles are uniformly dispersed in the coating composition by the organic compound and/or organometal compound coating the titanium particles, and the dispersing agent having an anionic polar group.

The coating composition of the present invention shows excellent dispersibility and dispersion stability of titanium oxide and manifests very little haze, because of compounding of a dispersing agent having an anionic polar group and coating with an organic compound and/or organometal compound having an anionic polar group. Namely, by adjusting refractive index by controlling the compounding amount of titanium oxide in the coating composition of the present invention, applying this coating composition on the surface of an application body such as a substrate and the like, and drying and curing, a coating layer having given refractive index, showing high transparency and manifesting little haze is obtained. Therefore, the coating composition of the present invention is suitable for forming one or more layers constituting an antireflection coating, and particularly, suitable for forming a middle refractive index layer, high refractive index layer or high refractive index hard coat layer in view of the adjustable range of refractive index by changing the compounding amount of titanium oxide.

Further, the coating composition of the present invention is excellent also in dispersion stability for a long period of time, therefore, the composition has long pot life, and a coating layer having high transparency and manifesting little haze can be formed even if the composition is used after storage for a long period of time.

Furthermore, the coating composition of the present invention is excellent in application aptitude, and can be applied easily on the surface of an application body, thinly, widely and uniformly, to form an uniform thin layer with large area. In particular, when a ketone-based solvent is used, the resulted viscosity is suitable, and a ketone-based solvent with slower evaporation speed tends to cause no drying unevenness of a coating layer, therefore, an uniform thin layer with large area is particularly easily formed.

By applying the coating composition of the present invention on the surface of an application body such as a substrate and the like, drying and curing with ionizing radiation, a coating layer which is substantially colorless and transparent and manifest little haze can be formed. This transparent coating layer having controlled refractive index can be utilized as an optical thin layer of various optical articles, and particularly, it is very suitable as a light transmission layer contained in an antireflection coating.

The support on which the coating composition of the present invention is applied is not particularly restricted. Exemplified as preferable supports are glass plates; films made of various resins such as triacetate cellulose (TAC), polyethylene terephthalate (PET), diacetyl cellulose, acetate butylate cellulose, polyether sulfone, acrylic resins; polyurethane-based resins; polyesters; polycarbonates; polysulfones; polyethers; trimethylpentene; polyether ketones; (meth)acrylonitrile and the like. The thickness of the support is usually from about 25 to 1000 μm, preferably from about 50 to 190 μm.

The coating composition can be applied on the substrate by various methods such as, for example, a spin coat method, dip method, spray method, slide coat method, bar coat method, roll coater method, meniscus coater method, flexo printing method, screen printing method, bead coater method and the like.

The coating composition of the present invention is applied in desired application amount on the surface of an application body such as the substrate and the like, then, usually, it is dried by heating by means of a heating means such as an oven and the like, then, it is cured by irradiation with ionizing radiation such as ultraviolet light, electron beam and the like, to form a coating layer.

Thus obtained coating layer comprises, rutile type titanium oxide coated with an inorganic compound decreasing or eliminating a photocatalyst activity and an organic compound and/or organometal compound having an anionic polar group, and having a primary particle size in the range from 0.01 to 0.1 μm, and a dispersing agent having an anionic polar group, which are uniformly mixed in a cured binder, and if necessary, it may contain other components.

The coating layer (cured layer) obtained by the present invention can be suitably utilized as one ore more layers constituting an antireflection coating, and particularly, suitable for forming a middle to high refractive index layer, in view of the range of refractive index which can be controlled by changing the compounding amount of titanium oxide. According to the present invention, it is possible that, when a coating layer having a layer thickness of 0.05 to 0.2 μm after curing is formed, the refractive index is controlled in the range from 1.55 to 2.30, and a haze value measured under condition of integration with the substrate according to JIS-K 7361-1 is controlled to the same value as in the case of using only the above-mentioned substrate or suppressed so that a difference from the haze value in the case of using only the above-mentioned substrate is within 1%.

The coating layer obtained by the present invention is suitable also for foaming a high refractive index hard coat layer. According to the present invention, it is possible that, when a coating layer having a layer thickness of 0.2 to 20 μm after curing is formed, the refractive index is in the range from 1.55 to 2.30, and a haze value according to JIS-K 7361-1 is controlled to the same value as in the case of using only the above-mentioned substrate or suppressed so that a difference from the haze value in the case of using only the above-mentioned substrate is within 10%, and a high refractive index hard coat layer can also be formed.

The coating layer according to the present invention can be suitably utilized for forming an antireflection coating. The antireflection coating, in principle, comprises at least a high refractive index layer and a low refractive index layer and further may comprise one or more middle refractive index layers, wherein the above-mentioned high refractive index layer, middle refractive index layer and low refractive index layer are laminated so that high refractive index and low refractive index alternately exchange and the low refractive index layer is situated at a position nearest to the appreciation surface. However, even if only one light transmission layer is provided on a surface to be coated with an antireflection coating, for example, a display surface of an image display, when the balance of the refractive index of the coated surface itself and the refractive index of the light transmission layer is just good, an antireflection effect is obtained, therefore, an antireflection coating having a single layer structure can also be used.

For obtaining an antireflection coating, usually, a hard coat layer is first provided, for the purpose of imparting sufficient hardness to the antireflection coating, on the surface of the support such as a substrate film, image display medium and the like, and a high refractive index layer, middle refractive index layer and low refractive index layer as described above are provided on the hard coat layer.

In some cases, a high refractive index hard coat layer having sufficient hardness and high refractive index together, and capable of manifesting a function as a hard coat layer and a function as a middle to high refractive index layer is provided. In this case, at least a high refractive index hard coat layer and a low refractive index layer are provided, and a high refractive index layer and/or one or more middle refractive index layers may further be provided, and the above-mentioned high refractive index hard coat layer, high refractive index layer, middle refractive index layer and low refractive index layer are laminated so that high refractive index and low refractive index alternately exchange, the high refractive index hard coat layer is situated at a position nearest to the contact surface with a display medium and the low refractive index layer is situated at a position nearest to the appreciation surface, thus an antireflection coating can be obtained.

Further, in the antireflection coating, a transparent conductive layer comprising ITO, ATO and the like is provided for the purpose of imparting an electrification preventing function, or a stain-proofing layer comprising a fluorine-based surfactant, fluorine-based silicone coating agent and the like is provided on the surface of a low refractive index layer, in some cases.

Any of the above-mentioned various layers is a light transmission layer having light transmitting ability, and the antireflection coating has a single layer structure composed of one light transmission layer having light transmitting ability, or a multi-layer structure in which two or more light transmission layers having light transmitting ability and mutually different refractive indices are laminated. The coating layer of the present invention can be used for forming one or more light transmission layers contained in these single layer type antireflection coating and multi-layer type antireflection coating.

Therefore, by applying the above-mentioned coating composition of the present invention on a surface to be coated with the coating composition and curing the composition, an antireflection coating having a single layer structure composed of one light transmission layer having light transmitting ability, or a multi-layer structure in which two or more light transmission layers having light transmitting ability and mutually different refractive indices are laminated is obtained, wherein at least one of the above-mentioned light transmission layer is a cured layer comprising rutile type titanium oxide coated with an inorganic compound decreasing or eliminating a photocatalyst activity and an organic compound and/or organometal compound having an anionic polar group and having a primary particle size in the range from 0.01 to 0.1 μm, and a dispersing agent having an anionic polar group, which are uniformly mixed in a cured binder.

The above-mentioned cured layer (coating layer of the present invention) is excellent in transparency and can have a refractive index of 1.55 or more, and mainly used as a middle refractive index layer, however, it may be used also as a high refractive index layer or a high refractive index hard coat layer. Here, a layer having the highest refractive index in the multi-layer type antireflection coating is called as a high refractive index layer, and a layer having the lowest refractive index is called as a low refractive index layer, and other layers having intermediately refractive indices are called as a middle refractive index layer.

When the above-mentioned cured layer is used as a high refractive index hard coat layer, it may be permissible that the surface of the high refractive index hard coat layer is formed in a fine irregular configuration, to give a hard coat layer functioning as an anti-glare layer. The surface of the high refractive index hard coat layer can be imparted with a fine irregular configuration by applying a coating composition for a high refractive index hard coat layer on a substrate and effecting emboss processing, or applying a coating composition for a high refractive index hard coat layer in which an inorganic or organic filler is dispersed on the substrate.

When a difference Δn between the refractive index of a filler added to form fine irregularity on the surface of the above-mentioned cured layer as a high refractive index hard coat layer and the refractive index of a binder after curing is controlled as follows: $0.01 \leq \Delta n \leq 0.5$ and the average particle size d of the filler is controlled as follows: usually 0.1 $\mu m \leq d \leq 10$ μm, preferably 1 $\mu m \leq d \leq 5$ μm, then, "glare" occurring due to irregularity on an anti-glare layer and transmission light from a display can be effectively suppressed, thereby giving a display having further excellent visibility.

Particularly, by using a coating composition containing 4 to 20 parts by weight of the above-mentioned binder component having an anionic polar group in the molecule and 2 to 4 parts by weight of a dispersing agent based on 10 parts by weight of titanium oxide, a high refractive index layer and/or middle refractive index layer having a layer thickness of 0.05 to 0.2 μm, having a refractive index of 1.55 to 2.30, and in which a haze value according to JIS-K 7361-1 is the same value as in the case of using only the above-mentioned substrate or a difference from the haze value in the case of using only the above-mentioned substrate is within 1% can be formed.

Further, by using a coating composition containing 4 to 40 parts by weight of the above-mentioned binder component having an anionic polar group in the molecule and 2 to 10 parts by weight of a dispersing agent based on 10 to 20 parts by weight of titanium oxide, a high refractive index layer, having a layer thickness of 0.2 to 20 μm, having a refractive index of 1.55 to 2.30, and in which a haze value according to JIS-K 7361-1 is the same value as in the case of using only the above-mentioned substrate or a difference from the haze value in the case of using only the above-mentioned substrate is within 10% can be formed.

By applying the coating composition of the present invention on a support on which one or more some light transmission layers have been previously formed if necessary, drying, and then curing by irradiation with ionizing radiation, a coating layer comprising rutile type titanium oxide coated with an inorganic compound decreasing or eliminating a photocatalyst activity and an organic compound and/or organometal compound having an anionic polar group and having a primary particle size in the range from 0.01 to 0.1 μm, and a dispersing agent having an anionic polar group, which are uniformly mixed in a cured binder is formed, and thus an antireflection coating having a cured layer composed of such a coating layer is obtained.

When a high refractive index layer and/or middle refractive index layer is formed by using the coating composition of the present invention, a middle to high refractive index layer having a layer thickness of 0.05 to 0.2 μm, having a refractive index of 1.55 to 2.30, and in which a haze value according to JIS-K 7361-1 is the same value as in the case of using only the above-mentioned substrate or a difference from the haze value in the case of using only the above-mentioned substrate is within 1% can be formed.

When a high refractive index layer is formed by using the coating composition of the present invention, a high refractive index hard coat layer having a layer thickness of 0.2 to 20 μm, having a refractive index of 1.55 to 2.30, and in which a haze value according to JIS-K 7361-1 is the same value as in the case of using only the above-mentioned substrate or a difference from the haze value in the case of using only the above-mentioned substrate is within 10% can be formed.

The coating layer of the present invention is suitably used for forming at least one layer, particularly a middle refractive index layer, in a multi-layer type antireflection coating which coats the display surface of an image display such as a liquid crystal display (LCD), cathode ray tube display (CRT), plasma display panel (PDP), electro luminescence display (ELD) and the like.

FIG. 1 is a view schematically showing the section of one example (101) of a liquid crystal display in which the display surface is coated with a multi-layer type antireflection coating containing the coating layer of the present invention as a light transmission layer. For forming the liquid crystal display 101, a color filter 4 in which RGB pixel part 2 (2R, 2G, 2B) and a black matrix layer 3 are formed on one surface of a glass substrate 1 arranged at the display surface side is prepared, a transparent electrode layer 5 is provided on the pixel part 2 of this color filter, a transparent electrode layer 7 is provided on one surface of a glass substrate 6 arranged at the back light side, and the glass substrate at the back light side and the color filter are allowed to face to each other while keeping a given gap so that the transparent electrode layers 5 and 7 mutually face, the peripheral region is adhered with sealing material 8, liquid crystal L is charged into the gap, an orientation layer 9 is formed on the outer surface of the glass substrate 6 arranged at the rear surface side, a polarization film 10 is pasted on the outer surface of the glass substrate 1 arranged at the display surface side, and a back light unit 11 is placed on the rear side.

Figure 2:
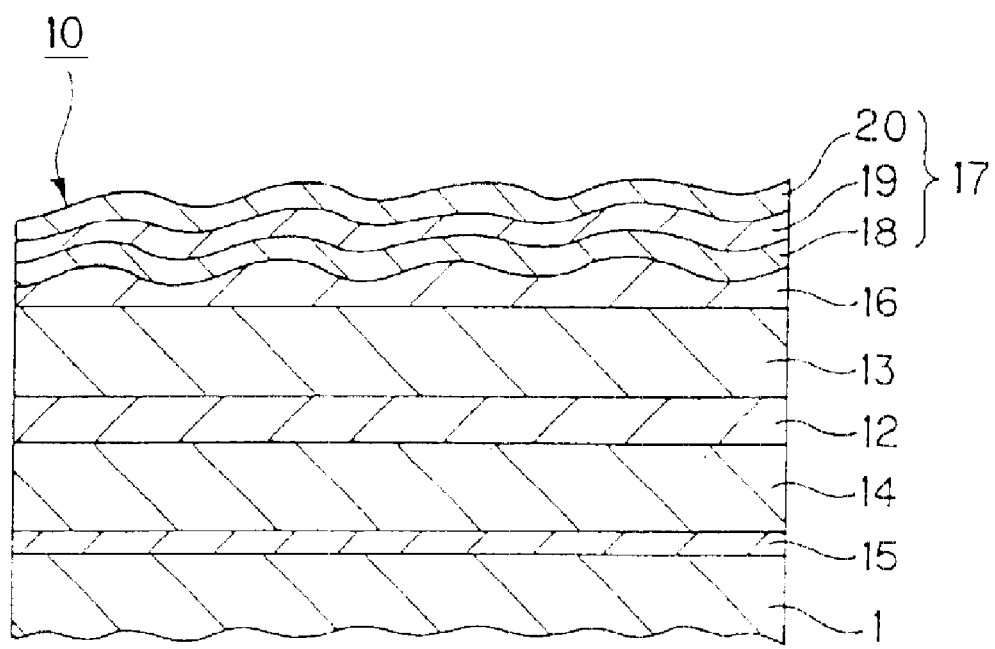
FIG. 2 is a view showing one example of an orientation plate on which a multi-layer type antireflection coating containing a coating layer of the present invention is provided, and showing its section schematically.

FIG. 2 shows schematically the section of the polarization film 10 pasted on the outer surface of the glass substrate 1 arranged at the display surface side. The polarization film 10 on the display surface side is obtainable by coating both surfaces of a polarization element 12 made of polyvinyl alcohol (PVA) and the like with protective films 13, 14 made of triacetyl cellulose (TAC) and the like, providing an adhesive layer 15 on the rear surface side, and forming a hard coat layer 16 and a multi-layer type antireflection coating 17 on its appreciation side, and it is sequentially pasted on the glass substrate 1 arranged at the display surface side via the adhesive layer 15.

The hard coat layer 16 can be formed by diluting a poly-functional acryl monomer such as dipentaerythritol hexa acrylate (DPHA) and the like in a solvent, and subjecting to gravure coating and the like.

The hard coat layer 16 may be a general clear hard coat layer, or an anti-glare hard coat layer. Namely, by forming the surface of the hard coat layer 16 in fine irregular configuration by emboss processing, or a method of dispersing an inorganic or organic filler in the hard coat layer 16 or other methods, a hard coat layer functioning as an anti-glare layer having an function of scattering light emitted from outside can be obtained.

When a difference $\Delta n$ between the refractive index of a filler added to form fine irregularity on the surface of the hard coat layer 16 and the refractive index of a binder resin is controlled as follows: $0.01 \leq \Delta n \leq 0.5$ and the average particle size d of a filler is controlled as follows: usually 0.1 $\mu m \leq d \leq 10$ $\mu m$, preferably 1 $\mu m \leq d \leq 5$ $\mu m$, then, "glare" occurring due to the irregularity on an anti-glare layer and the transmission light from a display can be effectively suppressed, thus giving a display having further excellent visibility.

When the above-mentioned cured layer is used as a high refractive index hard coat layer, it may be permissible that the surface of the high refractive index hard coat layer is formed in a fine irregular configuration, to give a hard coat layer functioning as an anti-glare layer. The surface of the high refractive index hard coat layer can be imparted with the fine irregularity by applying a coating composition for a high refractive index hard coat layer on a substrate and effecting emboss processing, or applying a coating composition for a high refractive index hard coat layer in which an inorganic or organic filler is dispersed on a substrate.

It is also possible that the hard coat layer 16 is provided as a clear hard coat layer having no fine irregularity, and a high refractive index layer or middle refractive index layer having fine irregularity manifesting an anti-glare function is formed by using the coating composition of the present invention. In this case, it can be formed in the same manner as for a high refractive index hard coat layer having an anti-glare function, and for example, an inorganic or organic filler is dispersed in a coating composition for a high to middle refractive index layer, or, the surface of a high to middle refractive index layer is emboss-processed.

The multi-layer type antireflection coating 17 has a three-layer structure in which a middle refractive index layer 18, a high refractive index layer 19 and a low refractive index layer 20 are laminated sequentially from the back light side to the appreciation side. The multi-layer type antireflection coating 17 may have a two-layer structure in which a high refractive index layer 19 and a low refractive index layer 20 are laminated sequentially. When the surface of the hard coat layer 16 is formed in an irregular configuration, the multi-layer type antireflection coating 17 formed thereon also has irregularity as illustrated.

The low refractive index layer 20 can be a coating layer having a refractive index of 1.46 or less obtained from a coating liquid containing an inorganic substance such as silica, magnesium fluoride and the like, or a fluorine-based resin and the like, or a vapor-deposited layer made of silica, magnesium fluoride and the like produced by a vapor deposition method such as a chemical vapor deposition method (CVD), physical vapor deposition method (PVD) and the like. The middle refractive index layer 18 and high refractive index layer 19 can be formed by using the coating layer of the present invention, and as the middle refractive index layer 18, a light transmission layer having a refractive index of 1.46 to 1.80 is used, and as the high refractive index layer 19, a light transmission layer having a refractive index of 1.65 or more is used.

By the action of this antireflection coating, the reflectance of light emitted from an outer light source decreases, reflection of scene and fluorescent lamp thereby decreases, and thus display visibility is improved. Further, though outer light is reflected on the display surface and glare condition occurs, reflection of outer light is decreased by a light scattering effect owing to irregularity on the hard coat layer 16, and thus display visibility is further improved.

In the case of the liquid crystal display 101, the coating composition of the present invention is applied on a laminate composed of the polarization element 12 and protective films 13, 14 to form a middle refractive index layer 18 having a refractive index controlled in a range from 1.46 to 1.80 and a high refractive index layer 19 having a refractive index controlled in a range of 1.65 or more, and a low refractive index layer 20 can be further provided. The polarization film 10 containing the antireflection coating 17 can be pasted on the glass substrate 1 arranged at an appreciation side via the adhesive layer 15.

In contrast, an orientation plate is not pasted on the display surface of CRT, therefore, it is necessary to directly provide an antireflection coating thereon. However, it is complicated work to apply the coating composition of the present invention on the display surface of CRT. In such a case, if an antireflection film containing the coating layer of the present invention is produced and this is pasted on the display surface, an antireflection coating is formed, consequently, application of the coating composition of the present invention on the display surface is dispensable.

When two or more light transmission layers having light transmitting ability and having mutually different refractive indices are laminated on one surface or both surfaces of a substrate film having light transmitting ability and at least one of the light transmission layers is formed of the coating layer of the present invention, an antireflection film is obtained. The substrate film and light transmission layers are required to have light transmitting ability enabling use as a material of an antireflection film, and those as transparent as possible are preferable.

Figure 3:
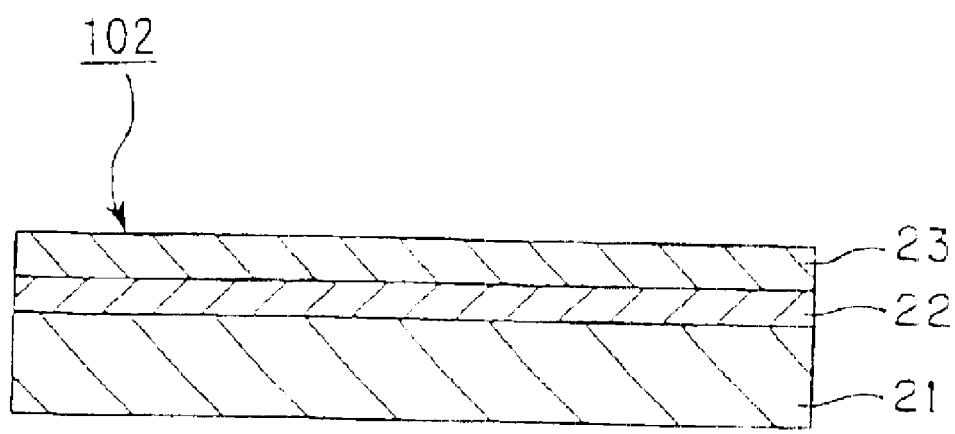
FIG. 3 is a view showing one example of an antireflection film containing a coating layer of the present invention, and showing its section schematically.

FIG. 3 shows schematically the section of one example (102) of an antireflection film containing the coating layer of the present invention. The antireflection film 102 is obtainable by applying the coating composition of the present invention on one surface side of the substrate film 21 having light transmitting ability to form a high refractive index layer 22, further providing a low refractive index layer 23 on this high refractive index layer. Though light transmission layers having mutually different refractive indices are composed of only tow layers, a high refractive index layer and a low refractive index layer, in this example, three or more light transmission layers may be provided. In this case, not only a high refractive index layer but also a middle refractive index layer can be formed by applying the coating composition of the present invention.

As described above, the coating composition of the present invention can sufficiently disperse fine particles of titanium oxide having high refractive index, and also exhibits an excellent dispersion stability, therefore, the use amount of a dispersing agent can be suppressed small, and by applying the coating composition on the application surface and curing the composition by irradiation with ionizing radiation, high refractive index and transparency necessary for optical members such as an antireflection coating and the like are obtained and simultaneously, sufficient coating layer strength and adhesive property with adjacent layers can be obtained.

Further, in the present invention, since the photocatalyst activity of titanium oxide is reduced or eliminated by surface treatment with an inorganic compound, decrease in strength of a coating layer owing to deterioration of binder components, and yellowing phenomenon which is a cause for decrease in an anti-reflection ability, do not occur easily.

Further, the coating composition of the present invention has excellent application aptitude, and can form an uniform thin layer having large area easily, therefore, suitable for mass production of a transparent layer manifesting little haze having controlled refractive index, at low cost.

The coating layer of the present invention is formed by using the above-mentioned coating composition of the present invention. This coating layer has high transparency, manifests little haze, and can control the compounding amount of titanium oxide to adjust refractive index, therefore, can be suitably utilized as one or more light transmission layers constituting an optical member, particularly, as a middle to high refractive index layer or high refractive index hard coat layer in an antireflection coating. When the binder component has a hydroxyl group-containing group, adhesive property with adjacent layers, among them, particularly with a vapor-deposition layer is particularly excellent.

Therefore, according to the present invention, a high quality antireflection coating obtained by laminating light transmission layers excellent in various properties such as transparency, layer strength, adhesive property with adjacent layers, uniformity of layer thickness and the like, and this antireflection coating is suitably applied to the display surface of a liquid crystal display, CRT and the like is provided. Further, according to the present invention, such an antireflection coating of high quality can be produced by wet coating.

Particularly, the above-mentioned coating composition is suitable for forming a middle refractive index layer, high refractive index layer or high refractive index hard coat layer, in view of the range of refractive index which can be controlled by changing the compounding amount of titanium oxide.

Further, according to the present invention, by using a binder component having an ionizing radiation-curing property and having a hydrogen bond-forming group, as a binder component in the coating composition, a cured layer excellent in adhesive property with adjacent layers can be formed.

Particularly, the present invention is useful in that very high adhesive property is obtained also with a layer formed by a dry coating method, such as a silicon oxide-deposited layer and titanium oxide-sputtered layer.

Further, the coating composition used in the present invention is extremely excellent also in application aptitude, can form an uniform antireflection coating without causing application mottling even on a hard coat layer having a clear surface on which interference color fleck is very visible, further, can form a layer with no application mottling even on a mat hard coat layer having a fine irregular surface.

The present invention will be proved by examples below.

EXAMPLE 1

(1) Preparation of Coating Composition

As the rutile-type titanium oxide, rutile-type titanium oxide (TTO51 (C), manufactured by Ishihara Sangyo Corporation, Ltd.) in which the titanium oxide content is 79 to 85%, its surface had been treated with $Al_2O_3$ and stearic acid, the primary particle size is 0.01 to 0.03 $\mu$m, the specific surface area is 50 to 60 $m^2/g$, the oil absorption is 24 to 30 g/100 g, and its surface shows water-repellency was provided. As the binder component having an ionizing radiation-curing property, pentaerythritol triacrylate (PET30, manufactured by Nippon Kayaku Co., Ltd.) was provided. As the dispersing agent having an anionic polar group, a block copolymer showing affinity with a pigment (Disperbyk 163, manufactured by BYK-Chemie Japan) was provided. As the photo-initiator, 1-hydroxy-cyclohexyl-phenyl-ketone (Irgacure 184, manufactured by Nippon Chiba Geigy) was provided. As the organic solvent, methyl isobutyl ketone was provided.

The rutile type titanium oxide, pentaerythritol triacrylate, dispersing agent (Disperbyk 163) and methyl isobutyl ketone were placed in a mayonnaise bottle, and zirconia beads ($\Phi$0.3 mm) at an about 4-times amount as that of the mixture was used as a medium and they were stirred for 10 hours in a paint shaker, and after stirring, a photo-initiator (Irgacure 184) was added to obtain a coating composition having the following composition.

| <Formulation of coating composition> | |
|---|---|
| Rutile-type titanium oxide (surface-treated with $Al_2O_3$ and stearic acid, having a primary particle size of 0.01 to 0.03 $\mu$m) (TTO51 (C), manufactured by Ishihara Surgyo Corporation, Ltd.): | 10 parts by weight |
| Pentaerythritol triacrylate (PET30, manufactured by Nippon Kayaku Co., Ltd.): | 4 parts by weight |
| Dispersing agent containing anionic polar group (Disperbyk 163, manufactured by BYK-Chemie Japan): | 2 parts by weight |
| Photo-initiator (Irgacure 184, manufactured by Nippon Chiba Geigy): | 0.2 parts by weight |
| Methyl isobutyl ketone: | 37.3 parts by weight |

(2) Production of Coating Layer

On a triacetyl cellulose film having a thickness of 80 $\mu$m (FT-T80UZ, manufactured by Fuji Photo Film Co., Ltd.), a pentaerythritol triacrylate cured layer having a thickness of 3 $\mu$m was formed, then, the coating composition directly after preparation was applied by a bar coater #2, and dried by heating at 60° C. for 1 minute, then cured by irradiation with UV of 500 mJ, to form a transparent layer having a layer thickness after curing of 0.1 $\mu$m.

For measuring haze, on a PET substrate having a thickness of 50 $\mu$m, a surface of which had not been treated (manufactured by Toray Industries, Inc., Luminar T60), the coating composition directly after preparation was applied by a bar coater #2, and dried by heating at 60° C. for 1 minute, then cured by irradiation with UV of 500 mJ, to form a transparent layer having a layer thickness after curing of 0.1 μm.

Further, the coating composition was left for 30 days at room temperature and generating state of precipitation was observed, further, using the coating composition after left, a transparent layer was formed on a PET substrate having a thickness of 50 μm, a surface of which had not been treated (manufactured by Toray Industries, Inc., Luminar T60) in the same manner as described above.

Haze and refractive index of transparent layers which were formed from the coating composition directly after preparation and the coating composition after left at room temperature respectively and had a thickness of 0.1 μm after curing were measured. Haze was measured by means of a turbidity meter NDH 2000 (manufactured by Nippon Denshoku Kogyo K.K.). As the refractive index of a coating layer after curing, refractive index of helium laser light at a wavelength of 633 nm was measured by means of a spectral ellipsometer (UVSEL, manufactured by Joban Ebon).

On this transparent layer, layer strength was evaluated based on change in haze when its layer surface was rubbed 20 times under a load of 200 g to 1 kg using #0000 of steel wool.

The results of those tests are shown in Table 1 (FIG. 15). When the coating composition prepared in Example 1 was used, a transparent layer excellent in haze and refractive index was obtained. Further, the coating composition in Example 1 was excellent in dispersibility also after left at room temperature, and a transparent layer excellent in haze and refractive index was obtained as well as the composition directly after preparation.

COMPARATIVE EXAMPLE 1

A coating composition was obtained in the same manner as in Example 1, except that, in stead of the rutile-type titanium oxide (TTO51 (C), manufactured by Ishihara Sangyo Corporation, Ltd.) subjected to hydrophobicizing treatment used in Example 1, rutile-type titanium oxide having a hydrophilic surface (TTO51 (A), manufactured by Ishihara Sangyo Corporation, Ltd.) in which the titanium oxide content is 76 to 83%, its surface had been treated only with $Al_2O_3$, the primary particle size is 0.01 to 0.03 aμm, the specific surface area is 75 to 85 m²/g, the oil absorption is 40 to 47 g/100 g, and its surface shows hydrophilicity was used in the same amount. The resulted coating composition was tested in the same manner as in Example 1.

The test results are shown in Table 1. The coating composition in Comparative Example 1 was used directly after preparation and a coating layer was formed, however, the resulted coating layer showed significant haze and had low refractive index. By left at room temperature, a large amount of precipitation was formed. Formation of a coating layer after left at room temperature was stopped.

COMPARATIVE EXAMPLE 2

A coating composition was obtained in the same manner as in Example 1, except that, instead of pentaerythritol triacrylate used in Example 1, pentaerythritol tetraacrylate (PET-40, manufactured by Nippon Kayaku Co., Ltd.) having no hydroxyl group was used in the same amount. The resulted coating composition was tested in the same manner as in Example 1.

The test results are shown in Table 1 as results of Comparative Example 2-1. The resulted coating composition had poor dispersibility, and already gelled directly after preparation, and an uniform thin layer could not be formed. Measurements of haze and refractive index, and observation after left at room temperature were stopped.

Then, the amount of the anionic group-containing dispersing agent (Disperbyk 163, manufactured by BYK-Chemie Japan) used in Example 1 was increased up to 6 parts by weight to prepare a coating composition, and tested in the same manner as in Example 1. The test results of this coating composition are shown in Table 1 as results of Comparative Example 2-2. In this case, rutile-type titanium oxide was uniformly dispersed, and change in viscosity and generation of a precipitate were not observed even after left at room temperature. Coating layers were formed using the composition directly after preparation and the composition after left at room temperature, respectively, then, the layers showed excellent result in haze. However, the refractive index in Comparative Example 2-2 was lower as compared with that in Example 1, and the coating layer strength was extremely low.

COMPARATIVE EXAMPLE 3

A coating composition was obtained in the same manner as in Example 1, except that, in stead of the rutile-type titanium oxide (TTO51 (C), manufactured by Ishihara Sangyo Corporation, Ltd.) having a primary particle size of 0.01 to 0.03 μm in which its surface had been treated with $Al_2O_3$ and stearic acid used in Example 1, rutile-type titanium oxide (TTO51 (N), manufactured by Ishihara Sangyo Corporation, Ltd.) having a primary particle size of 0.01 to 0.03 μm in which its surface had been treated neither with $Al_2O_3$ nor stearic acid was used in the same amount, as the rutile-type titanium oxide. The resulted coating composition was tested in the same manner as in Example 1.

The resulted coating composition showed poor dispersibility, gelled already directly after preparation, and an uniform thin layer could not be formed. Measurements of haze and refractive index, and observation after left at room temperature were stopped.

(Adhesive Property with Vapor-deposited Layer)

On a triacetyl cellulose film having a thickness of 80 μm (FT-T80UZ, manufactured by Fuji Photo Film Co., Ltd.), a pentaerythritol triacrylate cured layer having a thickness of 3 μm was formed, then, the coating compositions obtained in Example 1 and Comparative Example 2-2 were applied by a bar coater #2, and dried by heating at 60° C. for 1 minute, then cured by irradiation with UV of 500 mJ, to form a transparent layer having a layer thickness after curing of 0.1 μm. Then, a silica vapor-deposited layer having a layer thickness of 84.7 μm was formed by a PVD method under the following conditions.

<PVD Method Conditions>

Target for Heat vapor deposition: silicon monoxide (purity: 99.9%)

Output: current value: 0.4 A, voltage: 480 V

Degree of vacuum in vacuum chamber: 0.13 Pa

Argon flow rate: 38.8 sccm

Oxygen flow rate: 5 sccm

Vapor deposition speed: 8.47 nm/min.

On the resulted vapor-deposited layer, a adhesive property test (cellophane tape cross cut peeling test) described later was conducted. The test results are shown in Table 2 (FIG. 16). While the silica vapor-deposited layer coating on a cured layer formed from the coating composition of Comparative Example 2-2 was peeled at whole surface, the silica vapor-deposited layer coating on a cured layer formed from the coating composition of Example 1 was not peeled at all, revealing excellent adhesive property to a coating layer.

EXAMPLE 2

Figure 4:
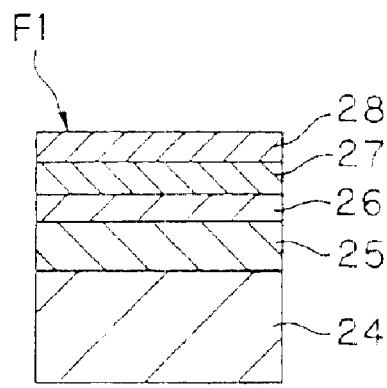
FIG. 4 is a view showing schematically the section of the antireflection film produced in Example 2.

In this example, an antireflection film F1 having a constitution shown in FIG. 4 was produced. The antireflection film F1 has a constitution in which a clear hard coat layer 25, middle refractive index layer 26, high refractive index layer 27 and low refractive index layer 28 are laminated sequentially on a substrate film 24, and of them, the high refractive index layer and middle refractive index layer were formed by using the coating composition of the present invention.

(1) Preparation of Coating Liquid for High Refractive Index Layer

As the rutile-type titanium oxide, rutile-type titanium oxide having a primary particle size of about 0.03 µm, coated with $Al_2O_3$ and stearic acid, was provided in an amount of 100 parts. As the binder component having an ionizing radiation-curing property, pentaerythritol triacrylate (PET30, manufactured by Nippon Kayaku Co., Ltd.) was provided in an amount of 20 parts. As the dispersing agent, a dispersing agent having an ethylene oxide chain and an anionic polar group (Adisper PA111, manufactured by Ajinomoto Co., Inc.) was provided in an amount of 20 parts.

These materials were mixed in methyl isobutyl ketone, to give a solid content of 15% by weight, and zirconia balls as a dispersion medium was added thereto, and the mixture was stirred for 7 hours or more in a paint shaker.

To the resulted dispersion, 3 parts of 1-hydroxy-cyclohexyl-phenyl-ketone (Irgacure 184) as a photo-initiator was added, then methyl isobutyl ketone was added there into dilute the solid content concentration to 3% by weight, thus obtaining a coating liquid for a high refractive index layer having a refractive index of 1.90.

(2) Preparation of Coating Liquid for Middle Refractive Index Layer

Into the above-mentioned dispersion obtained by stirring in a paint shaker, 3 parts of 1-hydroxy-cyclohexyl-phenyl-ketone (Irgacure 184) as a photo-initiator was added. To 100 parts of this mixture, 60 parts of dipentaerythritol pentaacrylate (DPPA) was further added, then, methyl isobutyl ketone was added to dilute the solid content concentration to 3% by weight, thus obtaining a coating liquid for a middle refractive index layer having a refractive index of 1.76.

(3) Application, Curing

On a PET (polyethylene terephthalate) substrate, a clear hard coat layer having a refractive index of 1.52 and a thickness after drying of 3 µm or more composed of dipentaerythritol hexaacrylate (DPHA) was applied. On the resulted clear hard coat layer, the above-mentioned coating liquid for a middle refractive index layer (refractive index: 1.76) was applied to form a middle refractive index layer having a refractive index of 1.76 and a thickness after drying of 60 nm, further, the above-mentioned coating liquid for a high refractive index layer (refractive index: 1.90) was applied thereon to form a high refractive index layer having a refractive index of 1.90 and a thickness after drying of 80 nm, which was cured by UV. Thus, a refractive index-controlled film for an antireflection film (intermediate product) having a layer constitution in which a hard coat layer, middle refractive index layer and high refractive index layer had been laminated in this order on one surface of the substrate was obtained. On the high refractive index layer of this refractive index-controlled film, a low refractive index layer having a refractive index of 1.42 and a thickness after drying of 100 nm composed of a silicon-containing vinylidene fluoride copolymer was applied, thus obtaining an antireflection film.

(4) Evaluation

On the antireflection film obtained in Example 2, reflectance, pencil hardness, adhesive property and application mottling were evaluated according to the following methods. The layer constitution and evaluation results of the antireflection film are shown in Table 3 and Table 4 (FIG. 17, FIG. 18), respectively.

The antireflection film obtained in Example 2 had a reflectance for visible light of 450 to 650 nm of 0.4 to 0.7%. This antireflection film had a pencil hardness of 3H.

If a mottling is formed when a coating composition for a middle refractive index layer is applied on a clear hard coat layer, with progress of lamination of a high refractive index layer, further, a low refractive index layer on this, the mottling on the lower layer becomes remarkable further, and each layer gives a mottling, leading to appearance not acceptable for a product, on the other hand, in this example, by changing of the solvent, an ability of applying an uniform thin layer on a clear hard coat layer is improved, and generation of mottling can be suppressed.

<Evaluation Method>

(a) Reflectance

On the rear surface of a sample, a black vinyl tape was pasted in view of an influence of reflection on the rear surface, and the reflectance at 380 nm to 780 nm was measured by means of a spectrophotometer. When one point was measured, a value at a wavelength of 550 nm at which person feels most dazzling is shown.

(b) Hardness

The pencil hardness was measured according to JIS 5400. Namely, writing with five pencils applying a load of 1 kg to a sample was conducted, and the sample was judged to have the same hardness as that of the most hard pencil when four of five pencils cause no scratch.

(c) Adhesive Property

According to JIS 5400, a cellophane tape cross cut peeling test was conducted. Namely, longitudinal 11 flaws and transversal 11 flaws were made by a cutter so that they crossed on the surface of a coating layer, to provide 100 cross cut squares with an interval of 1 mm. On this, a cellophane tape manufactured by Nichiban Co., Ltd. was closely pressed, then, peeled at a dash five times continuously, and the number of squares remaining on the layer surface was counted.

(d) Application Mottling

A sample was illuminated by a three bright line fluorescent light from a height of 3 to 5 m, and presence or absence of an application mottling (since this was an interference layer, mottling, namely, different interference color is visible) was observed.

EXAMPLE 3

Figure 5:
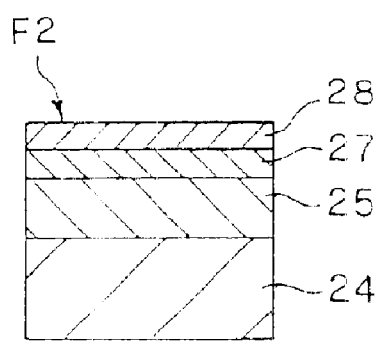
FIG. 5 is a view showing schematically the section of the antireflection film produced in Example 3.

In this example, an antireflection film F2 having a constitution shown in FIG. 5 was produced. The antireflection film F2 has a constitution in which a clear hard coat layer 25, high refractive index layer 27 and low refractive index layer 28 are laminated sequentially on a substrate film 24, and of them, the high refractive index layer was formed by using the coating composition of the present invention.

(1) Preparation of Coating Liquid for High Refractive Index Layer

As the rutile-type titanium oxide, rutile-type titanium oxide having a primary particle size of about 0.03 μm, coated with $ZrO_2$ and stearic acid, was provided in an amount of 100 parts. As the binder component having an ionizing radiation-curing property, pentaerythritol triacrylate (PET30, manufactured by Nippon Kayaku Co., Ltd.) was provided in an amount of 40 parts. As the dispersing agent, a dispersing agent having an ethylene oxide chain and having an anionic polar group was provided in an amount of 20 parts.

These materials were mixed in methyl isobutyl ketone, to give a solid content concentration of 15% by weight, and zirconia balls as a dispersion medium was added therein, and it was stirred for 7 hours or more in a paint shaker.

To the resulted dispersion, 3 parts of 1-hydroxy-cyclohexyl-phenyl-ketone (Irgacure 184) as a photo-initiator and 40 parts of pentaerythritol pentaacrylate (DPPA) was added, then, methyl isobutyl ketone was added to dilute the solid content concentration to 2% by weight, thus obtaining a coating liquid for a high refractive index layer having a refractive index of 1.76.

(2) Application, Curing

On a TAC (triacetyl cellulose) substrate, a clear hard coat layer having a refractive index of 1.51 and a thickness after drying of 3 μm or more composed of pentaerythritol triacrylate was applied, further, the above-mentioned coating liquid for a high refractive index layer (refractive index: 1.76) was applied thereon to form a high refractive index layer having a refractive index of 1.76 and a thickness after drying of 90 nm, and cured by UV. Thus, a refractive index-controlled film for an antireflection film (namely, intermediate product) having a layer constitution in which a hard coat layer, and high refractive index layer had been laminated in this order on one surface of the substrate was obtained. On the high refractive index layer of this refractive index-controlled film, a low refractive index layer having a refractive index of 1.42 and a thickness after drying of 90 nm composed of a silicon-containing vinylidene fluoride copolymer was applied, thus obtaining an antireflection film.

(3) Evaluation

The antireflection film obtained in Example 3 was tested in the same manner as in Example 2. The layer constitution and evaluation results are shown in Table 3 and Table 4, respectively. The antireflection film obtained in Example 3 had a reflectance at a wavelength of 550 nm at which person feels most dazzling of 0.4%. This antireflection film had a pencil hardness of 2H.

EXAMPLE 4

Figure 6:
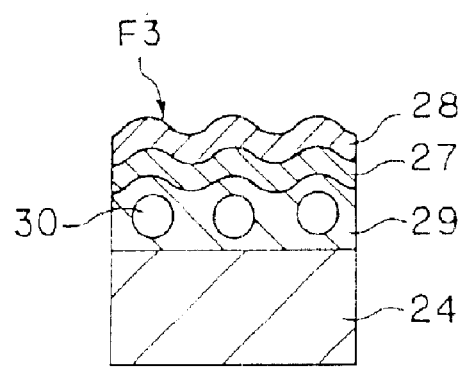
FIG. 6 is a view showing schematically the section of the antireflection film produced in Example 4.

In this example, an antireflection film F3 having a constitution shown in FIG. 6 was produced. The antireflection film F3 has a constitution in which a mat hard coat layer 29 containing a filler 30, high refractive index layer 27 and low refractive index layer 28 are laminated sequentially on a substrate film 24, and of them, the high refractive index layer was formed by using the coating composition of the present invention.

(1) Preparation of Coating Liquid for High Refractive Index Layer

A coating liquid for a high refractive index layer having a refractive index of 1.76 was obtained in the same manner as in Example 2 in which a coating liquid for a middle refractive index layer having a refractive index of 1.76 was prepared, except that the solvent was changed from methyl isobutyl ketone (MIBK) to a mixed solvent composed of 95 parts of MIBK and 5 parts of butylcellosolve.

(2) Application, Curing

On a TAC substrate, a coating liquid for a mat hard coat layer having a refractive index of 1.52 and having the following formulation was applied, and cured by UV to an extent causing no remaining of surface tack, to form an anti-glare mat hard coat layer with fine irregularity having a refractive index of 1.52 and a thickness after drying of 3 μm.

| <Coating liquid for mat hard coat layer> | |
|---|---|
| pentaerythritol triacrylate: | 2 parts |
| styrene paste (pentaerythritol triacrylate/beads = 6/4, particle size: 3.5 μm): | 0.5 parts |
| cellulose acetate polypropionate (CAP) (ethyl acetate solution having a solid content of 10 wt %): | 2.3 parts |
| solvent (toluene/cyclohexanone = 7/3): | 4.4 parts |
| initiator (Irgacure 651): | 0.06 parts |

On the fine irregular surface of the resulted mat hard coat layer, the above-mentioned coating liquid for a high refractive index layer (refractive index: 1.76) was applied, and cured by UV to form a high refractive index layer having a refractive index of 1.76 and a thickness after drying of 60 nm. Thus, a refractive index-controlled film for an antireflection film (namely, intermediate product) having a layer constitution in which a hard coat layer having an anti-glare property and high refractive index layer had been laminated in this order on one surface of the substrate was obtained. On the high refractive index layer of this refractive index-controlled film, a low refractive index layer having a refractive index of 1.42 and a thickness after drying of 90 nm composed of a silicon-containing vinylidene fluoride copolymer was applied, and completely cured by UV to obtain an anti reflection film.

(3) Evaluation

The antireflection film obtained in Example 4 was tested in the same manner as in Example 2. The layer constitution and evaluation results are shown in Table 3 and Table 4, respectively. The antireflection film obtained in Example 4 had a reflectance at a wavelength of 550 nm at which person feels most dazzling of 0.6%. This antireflection film had a pencil hardness of 2H.

In this example, by change of the solvent, application aptitude on a mat hard coat layer having a fine irregular surface was improved, and a coating liquid for a high refractive index layer could be applied without causing mottling.

EXAMPLE 5

Figure 7:
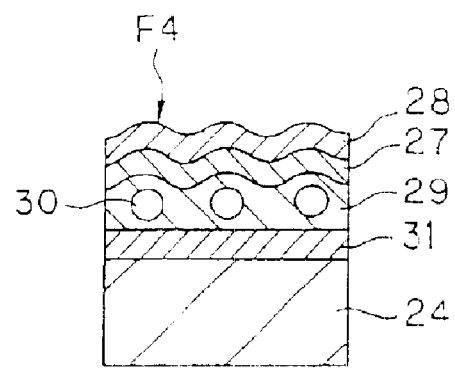
FIG. 7 is a view showing schematically the section of the antireflection film produced in Example 5.

In this example, an antireflection film F4 having a constitution shown in FIG. 7 was produced. The antireflection film F4 has a constitution in which a transparent conductive layer 31, anisotropic mat hard coat layer 29 containing a filler 30, high refractive index layer 27 and low refractive index layer 28 are laminated sequentially on a substrate film 24, and of them, the high refractive index layer was formed by using the coating composition of the present invention.

(1) Application, Curing

The same procedure as in Example 4 was conducted except that a transparent conductive layer was provided on the TAC substrate, and 0.005 parts of gold-nickel resin beads (Bright GNR4.6-EH, manufactured by Nippon Chemical Industrial Co., Ltd.) were added as a conductive material into the coating liquid for a mat hard coat layer.

Namely, on a TAC substrate, ATO-containing transparent conductive ink (manufactured by Sumitomo Osaka Cement Co., Ltd., Sumicefine ASP-BJ-1) was applied, and cured by UV to an extent causing no remaining of surface tack, to form a transparent conductive layer having a thickness after drying of 2 $\mu$m. On the resulted transparent conductive layer, a coating liquid for a mat hard coat layer into which a conductive material had been added was applied, and cured by UV to form an anti-glare anisotropic conductive mat hard coat layer having a refractive index of 1.52 and a thickness after drying of 3 to 4 $\mu$m and having fine irregularity.

Then, on the resulted mat hard coat layer, the coating liquid for a high refractive index layer (refractive index: 1.76) was applied, and cured by UV to form a high refractive index layer having a refractive index of 1.76 and a thickness after drying of 60 nm. Then, on the high refractive index layer, a low refractive index layer having a refractive index of 1.42 and a thickness after drying of 90 nm composed of a silicon-containing vinylidene fluoride copolymer was formed, and completely cured by UV to obtain an antireflection film.

(2) Evaluation

The antireflection film obtained in Example 5 was tested in the same manner as in Example 2. The layer constitution and evaluation results are shown in Table 3 and Table 4, respectively. The antireflection film obtained in Example 5 had a reflectance at a wavelength of 550 nm at which person feels most dazzling of 0.6%. This antireflection film had a pencil hardness of 2H.

EXAMPLE 6

Figure 8:
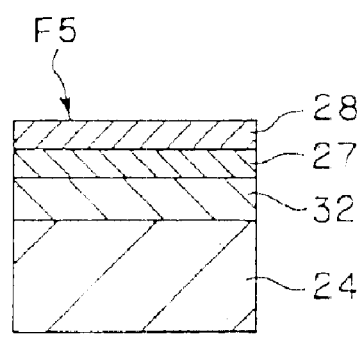
FIG. 8 is a view showing schematically the section of the antireflection film produced in Example 6.

In this example, an antireflection film F5 having a constitution shown in FIG. 8 was produced. The antireflection film F5 has a constitution in which a high refractive index clear hard coat layer 32, high refractive index layer 27 and low refractive index layer 28 are laminated sequentially on a substrate film 24, and of them, the high refractive index clear hard coat layer and high refractive index layer were formed by using the coating composition of the present invention.

(1) Preparation of Coating Liquid for High Refractive Index Layer

As the rutile-type titanium oxide, rutile-type titanium oxide having a primary particle size of about 0.03 $\mu$m, coated with $ZrO_2$ and stearic acid, was provided in an amount of 100 parts. As the binder component having an ionizing radiation-curing property, pentaerythritol triacrylate (PET30, manufactured by Nippon Kayaku Co., Ltd.) was provided in an amount of 40 parts. As the dispersing agent, a dispersing agent having an ethylene oxide chain and an anionic polar group was provided in an amount of 20 parts.

These materials were mixed in methyl isobutyl ketone, to give a solid content concentration of 15% by weight, and zirconia balls as a dispersion medium was added therein, and the mixture was stirred for 7 hours or more in a paint shaker.

To the resulted dispersion, 3 parts of 1-hydroxy-cyclohexyl-phenyl-ketone (Irgacure 184) as a photo-initiator and 40 parts of dipentaerythritol pentaacrylate (DPPA) were added, then, methyl isobutyl ketone was added to dilute the solid content concentration to 3% by weight, obtaining a coating liquid for a high refractive index layer having a refractive index of 1.84.

(2) Preparation of Coating Liquid for High Refractive Index Clear Hard Coat Layer Into the above-mentioned dispersion obtained by stirring in a paint shaker, 3 parts of 1-hydroxy-cyclohexyl-phenyl-ketone (Irgacure 184) as a photo-initiator was added. 100 parts of this mixture was mixed with 20 parts of dipentaerythritol pentaacrylate (DPPA) and 55 parts of dipentaerythritol triacrylate sufficiently, to obtain a coating liquid for a high refractive index layer clear hard coat layer having a refractive index of 1.70. Since this coating liquid has excellent dispersibility, a difference in haze from the substrate film was 0.01 even if the binder amount was increased.

(3) Application, Curing

On a TAC substrate, the above-mentioned coating liquid for a high refractive index clear hard coat layer having a refractive index of 1.70 was applied, and cured by UV to an extent causing no remaining of surface tack, to form a high refractive index clear hard coat layer having a refractive index of 1.70 and a thickness after drying of 5 $\mu$m. Thus, a refractive index-controlled film for an antireflection film (namely, intermediate product) having a layer constitution in which a high refractive index clear hard coat layer was provided on one surface of the substrate was obtained. Then, on the high refractive index clear hard coat layer, the coating liquid for a high refractive index layer having a refractive index of 1.84 was applied, and cured by UV, to form a high refractive index layer having a refractive index of 1.84 and a thickness after drying of 60 nm. Thus, a refractive index-controlled film for an antireflection film (namely, intermediate product) having a layer constitution in which a high refractive index clear hard coat layer and high refractive index layer were laminated in this order on one surface of the substrate was obtained. On the high refractive index layer of this refractive index-controlled film, a low refractive index layer having a refractive index of 1.42 and a thickness after drying of 90 nm composed of a silicon-containing vinylidene fluoride copolymer was formed, and completely cured by UV, to obtain an antireflection film.

(4) Evaluation

The antireflection film obtained in Example 6 was tested in the same manner as in Example 2. The layer constitution and evaluation results are shown in Table 3 and Table 4, respectively. The antireflection film obtained in Example 6 had a reflectance at a wavelength of 550 nm at which person feels most dazzling of 0.2%. This antireflection film had a pencil hardness of 2H.

EXAMPLE 7

Figure 9:
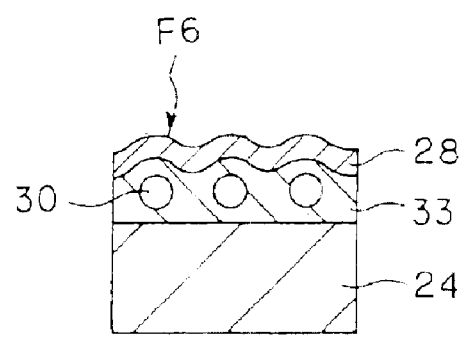
FIG. 9 is a view showing schematically the section of the antireflection film produced in Example 7.

In this example, an antireflection film F6 having a constitution shown in FIG. 9 was produced. The antireflection film F6 has a constitution in which a high refractive index mat hard coat layer 33 containing a filler 30, and low refractive index layer 28 are laminated sequentially on a substrate film 24, and of them, the high refractive index mat hard coat layer was formed by using the coating composition of the present invention.

(1) Preparation of Coating Liquid for High Refractive Index Mat Hard Coat Layer

A coating liquid for a clear hard coat layer having a refractive index of 1.70 was obtained in the same manner as in Example 6, and by using the resulted coating liquid, a coating liquid for a high refractive index mat hard coat layer having a refractive index of 1.66 and having the following composition was obtained. The dispersibility of the rutile-type titanium oxide ultra-fine particles was stable even if a mat material (acryl bead) and binder were added. Difference in haze from only the substrate film was measured to find it was 0.01 under a condition containing no irregularity settled in such manner that the coating liquid for a high refractive index mat hard coat layer containing a mat material was applied, and the surface was laminated with untreated PET, and then it was peeled after curing by UV.

| <Coating liquid for high refractive index mat hard coat layer> | |
|---|---|
| coating liquid for clear hard coat layer having a refractive index of 1.70 (solid content: 50 wt %): | 4 parts |
| acryl paste (pentaerythritol triacrylate/beads = 6/4, particle size: 3.5 μm): | 0.5 parts |
| cellulose acetate polypropionate (CAP) (ethyl acetate solution having a solid content of 10 wt %): | 2.3 parts |
| solvent (toluene): | 2.4 parts |
| initiator (Irgacure 651): | 0.06 parts |

(2) Application, Curing

On a TAC substrate, the above-mentioned coating liquid for a high refractive index clear hard coat layer having a refractive index of 1.66 was applied, and cured by UV to an extent causing no remaining of surface tack, to form a high refractive index mat hard coat layer having a fine irregular surface, having a refractive index of 1.66 and a thickness after drying of 3 μm. Thus, a refractive index-controlled film for an antireflection film (namely, intermediate product) having a layer constitution in which a high refractive index hard coat layer having anti-glare ability was laminated on one surface of the substrate was obtained. On-the high refractive index mat hard coat layer of this refractive index-controlled film, a low refractive index layer having a refractive index of 1.42 and a thickness after drying of 90 nm, composed of a silicon-containing vinylidene fluoride copolymer was applied, and completely cured by UV, to obtain an antireflection film.

(3) Evaluation

The antireflection film obtained in Example 7 was tested in the same manner as in Example 2. The layer constitution and evaluation results are shown in Table 3 and Table 4, respectively. The antireflection film obtained in Example 7 had a reflectance at a wavelength of 550 nm at which person feels most dazzling of 0.8%. This antireflection film had a pencil hardness of 2H.

EXAMPLE 8

Figure 10:
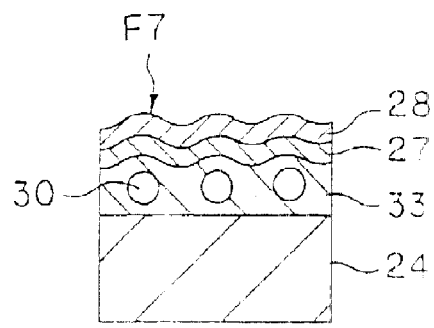
FIG. 10 is a view showing schematically the section of the antireflection film produced in Example 8.

In this example, an antireflection film F7 having a constitution shown in FIG. 10 was produced. The antireflection film F7 has a constitution in which a high refractive index mat hard coat layer 33 containing a filler 30, high refractive index layer 27 and low refractive index layer 28 are laminated sequentially on a substrate film 24, and of them, the high refractive index mat hard coat layer and high refractive index layer were formed by using the coating composition of the present invention.

(1) Application, Curing

On a TAC substrate, the coating liquid for a high refractive index mat hard coat layer having a refractive index of 1.66 obtained in Example 7 was applied, to form a high refractive index mat hard coat layer having a fine irregular surface, having a refractive index of 1.66 and a thickness after drying of 3 μm. Further, a coating liquid for a high refractive index layer having a refractive index of 1.84 obtained in Example 3 was applied thereon, and cured by UV to an extent causing no remaining of surface tack, to form a high refractive index layer having a refractive index of 1.84 and a thickness after drying of 180 nm. On the resulted high refractive index layer, a low refractive index layer having a refractive index of 1.40 and a thickness after drying of 90 nm composed of a silicon-containing vinylidene fluoride copolymer was applied, and completely cured by UV, to obtain an antireflection film.

(2) Evaluation

The antireflection film obtained in Example 8 was tested in the same manner as in Example 2. The layer constitution and evaluation results are shown in Table 3 and Table 4, respectively. The antireflection film obtained in Example 8 had a reflectance at a wavelength of 550 nm at which person feels most dazzling of 0.5%. This antireflection film had a pencil hardness of 2H.

EXAMPLE 9

Figure 11:
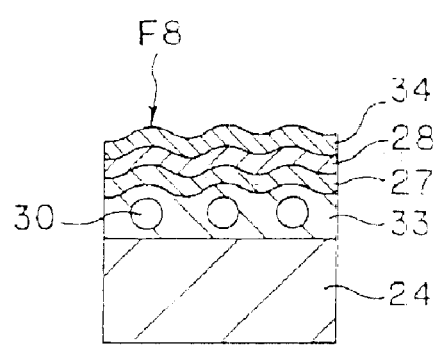
FIG. 11 is a view showing schematically the section of the antireflection film produced in Example 9.

In this example, an antireflection film F8 having a constitution shown in FIG. 11 was produced. The antireflection film F8 has a constitution in which a high refractive index mat hard coat layer 33 containing a filler 30, high refractive index layer 27, low refractive index layer 28 and a stain-proofing layer 34 are laminated sequentially on a substrate film 24, and of them, the high refractive index mat hard coat layer and high refractive index layer were formed by using the coating composition of the present invention.

(1) Application, Curing

The same procedure as in Example 8 was conducted until the high refractive index mat hard coat layer having a refractive index of 1.66 and the high refractive index layer having a refractive index of 1.84 were formed on the TAC substrate. Further, on the high refractive index layer having a refractive index of 1.84, sol-gel SiO$_2$ ink was coated as a coating liquid for a low refractive index layer having a refractive index of 1.45, dried at 80° C. for 1 minute, then, aged for 1 week at 40° C., to effect complete curing. On the resulted low refractive index layer, coating with a fluorine-based stain-proofing material was conducted to form a stain-proofing layer, thus obtaining an antireflection film.

(2) Evaluation

The antireflection film obtained in Example 9 was tested in the same manner as in Example 2. The layer constitution and evaluation results are shown in Table 3 and Table 4, respectively. The antireflection film obtained in Example 9 had a reflectance at a wavelength of 550 nm at which person feels most dazzling of 1.2%. This antireflection film had a pencil hardness of 3H.

EXAMPLE 10

Figure 12:
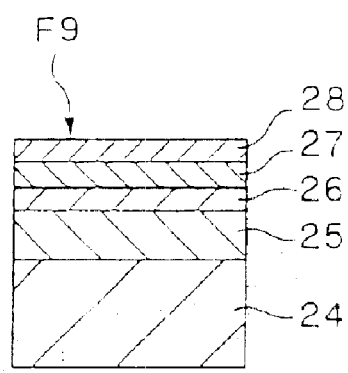
FIG. 12 is a view showing schematically the section of the antireflection film produced in Example 10.

In this example, an antireflection film F9 having a constitution shown in FIG. 12 was produced. The antireflection film F9 has a constitution in which a clear hard coat layer 25, middle refractive index layer 26, high refractive index layer 27 and low refractive index layer 28 are laminated sequentially on a substrate film 24, and of them, the middle refractive index layer was formed by using the coating composition of the present invention.

(1) Application, Curing

On a PET substrate, a clear hard coat layer having a refractive index of 1.52 and a thickness after drying of 7 μm or more composed of dipentaerythritol hexaacrylate (DPHA) was applied, further, the coating liquid for a high refractive index layer (refractive index: 1.76) obtained in Example 3 was applied thereon, and cured completely by UV, to form a middle refractive index layer having a refractive index of 1.76 and a thickness after drying of 70 nm. On the resulted middle refractive index layer, a titanium oxide layer (TiOx) having a refractive index of 1.90 and a thickness after drying of 80 nm was formed as a high refractive index layer also by sputtering. Further, a silicon oxide layer (SiOx) having a refractive index of 1.47 and a thickness after drying of 90 nm was formed thereon as a low refractive index layer by sputtering. Further, a fluorine-based stain-proofing material was coated thereon to form a stain-proofing layer, obtaining an antireflection film.

(2) Evaluation

The antireflection film obtained in Example 10 was tested in the same manner as in Example 2. The layer constitution and evaluation results are shown in Table 3 and Table 4, respectively. The antireflection film obtained in Example 10 had a reflectance in the visible region from 450 nm to 650 nm of 0.3 to 1.2%. This antireflection film had a pencil hardness of 3H.

EXAMPLE 11

Figure 13:
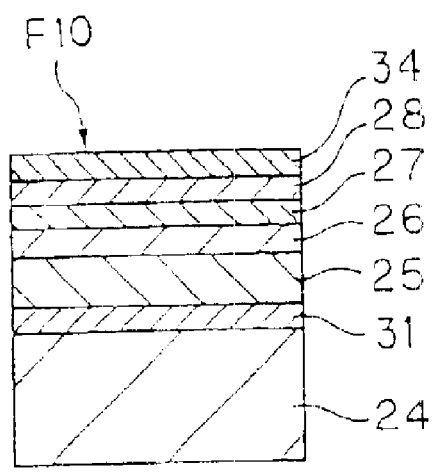
FIG. 13 is a view showing schematically the section of the antireflection film produced in Example 11.

In this example, an antireflection film F10 having a constitution shown in FIG. 13 was produced. The antireflection film F10 has a constitution in which a transparent conductive layer 31, anisotropic conductive clear hard coat layer 25, middle refractive index layer 26, high refractive index layer 27, low refractive index layer 28 and a stain-proofing layer 34 are laminated sequentially on a substrate film 24, and of them, the middle refractive index layer was formed by using the coating composition of the present invention.

(1) Application, Curing

A coating liquid for a clear hard coat layer having a refractive index of 1.52 was prepared by adding 0.005 parts of gold-nickel resin beads (Bright GNR4.6-EH, manufactured by Nippon Chemical Industrial Co., Ltd.) as a conductive material to dipentaerythritol hexaacrylate (DPHA).

Then, on a PET substrate, the same ATO-containing transparent conductive ink (manufactured by Sumitomo Osaka Cement Co., Ltd., Sumicefine ASP-BJ-1) as in Example 5 was applied, and cured by UV to an extent causing no remaining of surface tack, to form a transparent conductive layer having a thickness after drying of 2 $\mu$m. On the resulted transparent conductive layer, a coating liquid for a clear hard coat layer into which the above-mentioned conductive material had been added was applied, cured by UV, to form an anisotropic conductive clear hard coat layer having a refractive index of 1.52 and a thickness after drying of 7 $\mu$m or more was applied, further, the coating liquid for a high refractive index layer (refractive index: 1.76) obtained in Example 3 was applied thereon, and cured completely by UV to form a middle refractive index layer having a refractive index of 1.76 and a thickness after drying of 70 nm. On the resulted middle refractive index layer, a titanium oxide layer (TiOx) having a refractive index of 1.90 and a thickness after drying of 80 nm was formed as a high refractive index layer by sputtering, further, a silicon oxide layer (SiOx) having a refractive index of 1.47 and a thickness after drying of 90 nm was formed thereon as a low refractive index layer also by sputtering. Further, a fluorine-based stain-proofing material was coated thereon to form a stain-proofing layer, thus obtaining an antireflection film.

(2) Evaluation

The antireflection film obtained in Example 11 was tested in the same manner as in Example 2. The layer constitution and evaluation results are shown in Table 3 and Table 4, respectively. The antireflection film obtained in Example 11 had a reflectance in the visible region from 450 nm to 650 nm of 0.3 to 1.2% similarly to Example 10. This antireflection film also had a pencil hardness of 3H.

EXAMPLE 12

Figure 14:
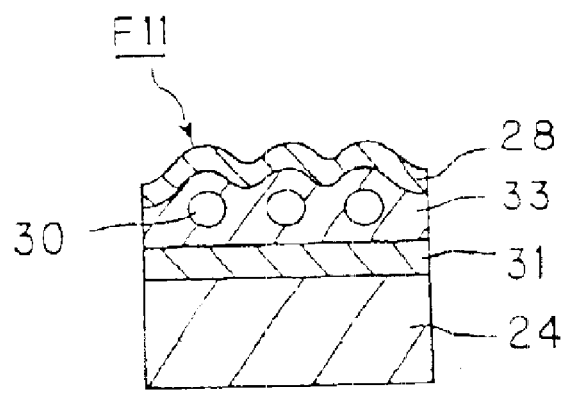
FIG. 14 is a view showing schematically the section of the antireflection film produced in Example 12.

In this example, an antireflection film F11 having a constitution shown in FIG. 14 was produced. The antireflection film F11 has a constitution in which a transparent conductive layer 31, a high refractive index mat hard coat layer 33 containing a filler 30, and low refractive index layer 28 are laminated sequentially on a substrate film 24, and of them, the high refractive index mat hard coat layer was formed by using the coating composition of the present invention.

(1) Preparation of Coating Liquid for Transparent Conductive Layer

The following components excepting a dilution solvent were mixed and sufficiently stirred, then, a dilution solvent was further mixed, to prepare a coating liquid for a transparent conductive layer (solid content: about 10 wt %).

| <coating liquid for transparent conductive layer> | |
|---|---|
| ATO: | 29.4 parts |
| OH group-containing binder 1 (urethane acrylate): | 14.2 parts |
| OH group-containing binder 2 (pentaerythritol triacrylate (PETA)/hexanediol diacrylate (HDDA) = 7/3): | 27.8 parts |
| solvent (methylcellosolve): | 55.0 parts |
| initiator (Irgacure 184): | 3 parts |
| dilution solvent (cyclohexanone/toluene = 3/7): | 584 parts |

(2) Preparation of Coating Liquid for Anisotropic Conductive High Refractive Index Mat Hard Coat Layer In the same manner as in Example 6, a coating liquid for a clear hard coat layer having a refractive index of 1.70 was obtained, and by using the resulted coating liquid, a coating liquid for an anisotropic conductive high refractive index mat hard coat layer having a refractive index of 1.66 and having the following composition was obtained. As the conductive fine particles, gold-nickel resin beads (Bright GNR4.6-EH, manufactured by Nippon Chemical Industrial Co., Ltd.) having an average particle size of 5 $\mu$m were used. The dispersibility of the rutile-type titanium oxide ultra-fine particles was stable even if a mat material (acryl bead) and binder were added, and difference in haze from only the substrate film was 0.01.

| <Coating liquid for anisotropic conductive high refractive index mat hard coat layer> | |
|---|---|
| coating liquid for clear hard coat layer having a refractive index of 1.70 (solid content: 50 wt %): | 4 parts |
| acryl paste (pentaerythritol triacrylate/beads = 6/4, particle size: 3.5 $\mu$m): | 0.5 parts |
| cellulose acetate polypropionate (CAP) (ethyl acetate solution having a solid content of 10 wt %): | 2.3 parts |
| initiator (Irgacure 651): | 0.06 parts |
| conductive fine particles (Bright GNR4.6-EH, manufactured by Nippon Chemical Industrial Co., Ltd.): | 0.045 parts (0.1 wt % based on all binder components) |
| solvent (toluene): | 2.4 parts |

(2) Application, Curing

On a TAC substrate, the above-mentioned coating liquid for a transparent conductive layer (solid content: about 10 wt %) was applied, and cured by UV to an extent causing no remaining of surface tack, to form a transparent conductive layer having a thickness after drying of 1.2 μm. On this conductive layer, the above-mentioned coating liquid for an anisotropic conductive high refractive index mat hard coat layer having a refractive index of 1.66 was applied, dried, and cured by UV to an extent causing no remaining of surface tack, to form an anisotropic conductive high refractive index mat hard coat layer having a fine irregular surface, a refractive index of 1.66, a thickness after drying of 3 μm and a surface resistance of $2\times10^7\Omega/\square$. On the resulted anisotropic conductive high refractive index mat hard coat layer, a low refractive index layer having a refractive index of 1.42 and a thickness after drying of 90 nm composed of a silicon-containing vinylidene fluoride copolymer was applied, and completely cured by UV, to obtain an antireflection film. Also when a PET substrate was used, an antireflection film could be produced likewise.

(3) Evaluation

The antireflection film obtained in Example 12 was tested in the same manner as in Example 2. The layer constitution and evaluation results are shown in Table 3 and Table 4, respectively. The antireflection film obtained in Example 12 had a reflectance at a wavelength of 550 nm at which person feels most dazzling of 0.8%. This antireflection film had a pencil hardness of 2H.

COMPARATIVE EXAMPLE 4

As the rutile-type titanium oxide, rutile-type titanium oxide having a primary particle size of about 0.03 μm, coated with $Al_2O_3$ and stearic acid, was provided in an amount of 100 parts. As the binder component having an ionizing radiation-curing property, pentaerythritol triacrylate (PET30, manufactured by Nippon Kayaku Co., Ltd.) was provided in an amount of 20 parts. No dispersing agent was used.

These materials were mixed in methyl isobutyl ketone, to give a solid content concentration of 15% by weight, and zirconia balls as a dispersion medium was added therein, and it was stirred for 7 hours or more in a paint shaker.

To the resulted dispersion, 3 parts of 1-hydroxy-cyclohexyl-phenyl-ketone (Irgacure 184) as a photo-initiator was added, then, methyl isobutyl ketone was added therein to dilute the solid content concentration to 3% by weight, thus obtaining a coating liquid for a high refractive index layer having a refractive index of 1.90.

When the resulted coating liquid was applied, the coating layer was opaque. Further, when the coating liquid was left for several hours, a precipitation was observed.

COMPARATIVE EXAMPLE 5

As the rutile-type titanium oxide, rutile-type titanium oxide having a primary particle size of about 0.03 μm, coated with $Al_2O_3$ but not with an anionic compound, was provided in an amount of 100 parts. As the binder component having an ionizing radiation-curing property, pentaerythritol triacrylate (PET30, manufactured by Nippon Kayaku Co., Ltd.) was provided in an amount of 20 parts. As the dispersing agent, a dispersing agent (Phosmer M) having an ethylene oxide chain and an anionic polar group was provided in an amount of 20 parts.

These materials were mixed in methyl isobutyl ketone, to give a solid content concentration of 15% by weight, and zirconia balls as a dispersion medium was added thereto, and it was stirred for 7 hours or more in a paint shaker.

To the resulted dispersion, 3 parts of 1-hydroxy-cyclohexyl-phenyl-ketone (Irgacure 184) as a photo-initiator was added, then, methyl isobutyl ketone was added therein to dilute the solid content concentration to 3% by weight, obtaining a coating liquid.

When the resulted coating liquid was applied, the coating layer was opaque. Further, when the coating liquid was left for several hours, a precipitation was observed.

COMPARATIVE EXAMPLE 6

Into a commercially available zirconia ($ZrO_2$) dispersion (solid content: 15 wt %, solvent: toluene 25.5/acetylacetone 42/others 17.5, manufactured by Sumitomo Osaka Cement Co., Ltd.), 3 parts of pentaerythritol triacrylate (PET30, manufactured by Nippon Kayaku Co., Ltd.) as an ionizing radiation-curable binder component was added, to prepare a coating liquid for a high refractive index layer having a refractive index of 1.76, and using this coating liquid for a high refractive index layer, antireflection films having the same layer constitutions as in Examples 3 and 10, respectively, were produced.

The antireflection film having the same layer constitution as in Examples 3 had a pencil hardness of F, and showed no adhesive property with the clear hard coat layer.

The antireflection film having the same layer constitution as in Examples 10 had a pencil hardness of H, and showed no adhesive property with the clear hard coat layer.

Due to complicated solvent system, a mottling tended to occur at the time of drying. When the above-mentioned zirconia ($ZrO_2$) dispersion was diluted using a ketone-based solvent suitable for coating to a solid content of 3%, a problem occurred that dispersibility deteriorated possibly due to poor compatibility with the dispersing agent.

What is claimed is:

1. A coating composition comprising:,
   (1) rutile type titanium oxide coated with an inorganic compound decreasing or eliminating a photocatalyst activity and an organic compound and/or organometal compound having an anionic polar group having an anionic polar group, and having a primary particle size in the range from 0.01 to 0.1 μm,
   (2) a binder component having an ionizing radiation-curing property,
   (3) a dispersing agent having an anionic polar group, wherein the dispersing agent is a compound having a molecule structure in which a side chain composed of an anionic polar group or a side chain having an anionic polar group is bonded to a principal chain having a skeleton of an ethylene oxide chain, and having a number-average molecular weight of 2000 to 20000, and
   (4) an organic solvent.

2. A coating composition according to claim 1 wherein the inorganic compound is selected from the group consisting of alumina, silica, zinc oxide, zirconium oxide, tin oxide, tin oxide doped with antimony (ATO), indium oxide doped with tin (ITO), indium oxide doped with zinc (IZO), zinc oxide doped with aluminum (AZO) and tin oxide doped with fluorine (FTO).

3. A coating composition according to claim 1 wherein the binder component is a binder component having an anionic polar group in the molecule.

4. A coating composition according to claim 3 wherein the anionic polar group of the binder component is a hydrogen bond-forming group.

5. A coating composition according to claim 4 wherein the hydrogen bond-forming group of the binder component is a hydroxyl group.

6. A coating composition according to claim 5 wherein the binder component having a hydroxyl group in the molecule is one or more components selected from the group consisting of pentaerythritol poly-functional acrylates, dipentaerythritol poly-functional acrylates, pentaerythritol poly-functional methacrylates and dipentaerythritol poly-functional methacrylates.

7. A coating composition according to claim 3 wherein, the binder component having an anionic polar group in the molecule is contained in a ratio of 4 to 20 parts by weight and the dispersing agent is contained in a ratio of 2 to 4 parts by weight based on 10 parts by weight of the titanium oxide.

8. A coating composition according to claim 3 wherein, the binder component having an anionic polar group in the molecule is contained in a ratio of 4 to 40 parts by weight and the dispersing agent is contained in a ratio of 2 to 10 parts by weight based on 10 to 20 parts by weight of the titanium oxide.

9. A coating composition according to claim 1 wherein the organic compound having an anionic polar group is an organic carboxylic acid.

10. A coating composition according to claim 1 wherein the organic solvent is a ketone-based solvent.

11. A coating composition according to claim 1 further comprising, as a photo-initiator, 1-hydroxy-cyclohexyl-phenylketone and/or 2-methyl-1[4-(methylthio)phenyl]-2-morpholinopropan-1-one.

12. A coating composition according to claim 1 wherein the organic solvent is mixed in a ratio of 50 to 99.5 parts by weight with 0.5 to 50 parts by weight of all solid components.

13. A coating composition according to claim 1 wherein the composition is used for forming an antireflection coating.

14. A coating composition according to claim 7 wherein the composition is used for forming a middle refractive index layer or high refractive index layer of an antireflection coating.

15. A coating composition according to claim 8 wherein the composition is used for forming a high refractive index hard coat layer of an antireflection coating.

16. A coating layer obtainable by applying the coating composition of any of claim 1 on the surface of an application body and curing the composition, wherein, when the layer thickness after curing is 0.05 to 0.2 μm, the refractive index is 1.55 to 2.30, and a haze value according to JIS-K 7361-1 is the same as in the case of using only the substrate or a difference from the haze value in the case of using only the substrate is within 1%.

17. A coating layer obtainable by applying the coating composition of any of claim 1 on the surface of an application body and curing the composition, wherein, when the layer thickness after curing is 0.2 to 20 μm, the refractive index is 1.55 to 2.30, and a haze value according to JIS-K 7361-1 is the same as in the case of using only the substrate or a difference from the haze value in the case of using only the substrate is within 10%.

18. A coating layer comprising rutile type titanium oxide coated with an inorganic compound decreasing or eliminating a photocatalyst activity and an organic compound and/or organometal compound having an anionic polar group, and having a primary particle size in the range from 0.01 to 0.1 μm, and a dispersing agent having a molecular structure in which a side chain composed of an anionic polar group or a side chain having an anionic polar group is bonded to a principal chain having a skeleton of an ethylene oxide chain, uniformly mixed in a cured binder, wherein, when the layer thickness after curing is 0.05 to 0.2 μm, the refractive index is 1.55 to 2.30, and a haze value according to JIS-K 7361-1 is the same as in the case of using only the substrate or a difference from the haze value in the case of using only the substrate is within 1%.

19. A coating layer comprising rutile type titanium oxide coated with an inorganic compound decreasing or eliminating a photocatalyst activity and an organic compound and/or organometal compound having an anionic polar group, and having a primary particle size in the range from 0.01 to 0.1 μm, and a dispersing agent having a molecule structure in which a side chain composed of an anionic polar group or a side chain having an anionic polar group is bonded to a principal chain having a skeleton of an ethylene oxide chain, uniformly mixed in a cured binder, wherein, when the layer thickness after curing is 0.2 to 20 μm, the refractive index is 1.55 to 2.30, and a haze value according to JIS-K 7361-1 is the same as in the case of using only the substrate or a difference from the haze value in the case of using only the substrate is within 10%.

20. A coating layer according to claim 18 wherein the binder is a cured product of one or more components selected from the group consisting of pentaerythritol poly-functional acrylates, dipentaerythritol poly-functional acrylates, pentaerythritol poly-functional methacrylates and dipentaerythritol poly-functional methacrylates.

21. An antireflection coating comprising a single layer structure composed of one light transmission layer having light transmitting ability or a multi-layer structure having lamination of two or more light transmission layers having light transmitting ability and mutually different refractive indices, wherein at least one of the light transmission layers is a cured layer containing rutile type titanium oxide coated with an inorganic compound decreasing or eliminating a photocatalyst activity and an organic compound and/or organometal compound having an anionic polar group, and having a primary particle size in the range from 0.01 to 0.1 μm, and a dispersing agent having a molecule structure in which a side chain composed of an anionic polar group or a side chain having an anionic polar group is bonded to a principal chain having a skeleton of an ethylene oxide chain, uniformly mixed in the cured binder.

22. An antireflection coating according to claim 21 wherein the cured layer is a coating layer obtainable by applying a coating composition containing, as essential components, (1) rutile type titanium oxide coated with an inorganic compound decreasing or eliminating a photocatalyst activity and an organic compound and/or organometal compound having an anionic polar group, and having a primary particle size in the range from 0.01 to 0.1 μm, (2) a binder component having an ionizing radiation-curing property, (3) a dispersing agent having an anionic polar group, wherein the dispersing agent is a compound having a molecule structure in which a side chain composed of an anionic polar group or a side chain having an anionic polar group is bonded to a principal chain having a skeleton of an ethylene oxide chain, and having a number-average molecular weight of 2000 to 20000, and (4) an organic solvent on a surface to be coated with the cured layer and curing the composition.

23. An antireflection coating according to claim 21 wherein the inorganic compound is selected from the group consisting of alumina, silica, zinc oxide, zirconium oxide, tin oxide, tin oxide doped with antimony (ATO), indium oxide doped with tin (ITO), indium oxide doped with zinc (IZO), zinc oxide doped with aluminum (AZO) and tin oxide doped with fluorine (FTO).

24. An antireflection coating according to claim 21 wherein the organic compound having an anionic polar group is an organic carboxylic acid.

25. The antireflection coating according to claim 21 wherein the organometal compound having an anionic polar group is composed of a silane coupling agent and/or titanate coupling agent.

26. An antireflection coating according to claim 21 wherein the binder is a cured product of a binder component having an anionic polar group.

27. An antireflection coating according to claim 26 wherein the binder is a cured product containing a remaining hydrogen bond-forming group as the anionic polar group.

28. An antireflection coating according to claim 27 wherein the binder is a cured product containing a remaining hydroxyl group as the hydrogen bond-forming group.

29. An antireflection coating according to claim 28 wherein the binder is a cured product of one or more components selected from the group consisting of pentaerythritol polyfunctional acrylates, dipentaerythritol polyfunctional acrylates, pentaerythritol poly-functional methacrylates and dipentaerythritol poly-functional methacrylates.

30. An antireflection coating according to claim 21 wherein the coating has at least a high refractive index layer and a low refractive index layer as the light transmission layer and may further has one or more middle refractive index layers, and the high refractive index layer, middle refractive index layer and low refractive index layer are laminated so that high refractive index and low refractive index alternate and the low refractive index layer is situated at a position nearest to the appreciation surface, and at least one of the high refractive index layer and the middle refractive index layer is formed of the above-mentioned cured layer.

31. An antireflection coating according to claim 30 wherein the high refractive index layer and/or middle refractive index layer formed of the cured layer has a layer thickness after curing of 0.05 to 0.2 μm, has a refractive index of 1.55 to 2.30, and a haze value according to JIS-K 7361-1 is the same as in the case of using only the substrate or a difference from the haze value in the case of using only the substrate is within 1%.

32. An antireflection coating according to claim 30 wherein at least one of the high refractive index layer and the middle refractive index layer contains a binder composed of a cured product containing a remaining hydrogen bond-forming group, and the high refractive index layer, middle refractive index layer or low refractive index layer containing a hydrogen bond-forming group is formed by a dry coating method adjacently to the high refractive index layer or middle refractive index layer formed of the cured layer.

33. An antireflection coating according to claim 32 wherein as the high refractive index layer or middle refractive index layer containing a hydrogen bond-forming group, a sputtering layer containing titanium oxide is formed.

34. An antireflection coating according to claim 32 wherein as the low refractive index layer containing a hydrogen bond-forming group, a vapor-deposited layer containing silicon oxide is formed.

35. An antireflection coating according to claim 30 wherein as the light transmission layer, a hard coat layer is further provided, and the high refractive index layer or the middle refractive index layer is formed of the cured layer, adjacent to the appreciation surface side of the hard coat layer.

36. An antireflection coating according to claim 21 wherein the coating has, at least, a high refractive index hard coat layer having refractive index capable of functioning as a high to middle refractive index layer, and a low refractive index layer, as the light transmission layer and may further has a high refractive index layer and/or one or more middle refractive index layers, and the high refractive index hard coat layer, the high refractive index layer, the middle refractive index layer and the low refractive index layer are laminated so that high refractive index and low refractive index alternate, the high refractive index hard coat layer is situated at a position nearest to the contact surface side to the display medium, and the low refractive index layer is situated at a position nearest to the appreciation surface side, and the high refractive index hard coat layer is formed of the cured layer.

37. An antireflection coating according to claim 36 wherein the high refractive index hard coat layer formed of the cured layer has an anti-glare fine irregular surface.

38. An antireflection coating according to claim 36 wherein the high refractive index hard coat layer formed of the cured layer has a layer thickness of 0.2 to 20 μm, has a refractive index of 1.55 to 2.30, and a haze value according to JIS-K 7361-1 is the same as in the case of using only the substrate or a difference from the haze value in the case of using only the substrate is within 10%.

39. An antireflection coating according to claim 36 wherein the high refractive index hard coat layer contains a binder composed of a cured product containing a remaining hydrogen bond-forming group, and the high refractive index layer, middle refractive index layer, low refractive index layer or transparent conductive layer adjacent to the high refractive index hard coat layer and containing a hydrogen bond-forming group is formed by a dry coating method.

40. An antireflection film obtainable by laminating the antireflection coating of claim 21 on at least one surface of a substrate film having light transmitting ability so that the low refractive index layer of the antireflection coating is situated on the appreciation surface side.

41. An image display in which the display surface is coated with the antireflection coating of claim 21 so that the low refractive index layer of the antireflection coating is situated on the appreciation surface side.

42. An intermediate product for an antireflection film, wherein the product has a high refractive index layer on at least one surface of a substrate film having light transmitting ability, and may further has one or more middle refractive index layers, and the high refractive index layer and the middle refractive index layer are laminated so that high refractive index and low refractive index alternate, and at least one of the high refractive index layer and the middle refractive index layer is a cured layer containing rutile type titanium oxide coated with an inorganic compound decreasing or eliminating a photocatalyst activity and an organic compound and/or organometal compound having an anionic polar group, and having a primary particle size in the range from 0.01 to 0.1 µm, and a dispersing agent having a molecule structure in which a side chain composed of an anionic polar group or a side chain having an anionic polar group is bonded to a principal chain having a skeleton of an ethylene oxide chain, uniformly mixed in the cured binder.

43. An intermediate product according to claim 42 wherein the high refractive index layer and/or middle refractive index layer formed of the cured layer has an anti-glare fine irregular surface.

44. An intermediate product according to claim 42 wherein the high refractive index layer and/or middle refractive index layer formed of the cured layer has a layer thickness of 0.05 to 0.2 µm, has a refractive index of 1.55 to 2.30, and a haze value according to JIS-K 7361-1 is the same as in the case of using only the substrate or a difference from the haze value in the case of using only the substrate is within 1%.

45. An intermediate product for an antireflection film, wherein the product has at least a high refractive index hard coat layer having refractive index capable of functioning as a high to middle refractive index layer on at least one surface of a substrate film having light transmitting ability, and may further has a high refractive index layer and/or one or more middle refractive index layers, and the high refractive index hard coat layer, high refractive index layer and middle refractive index layer are laminated so that high refractive index and low refractive index alternate, and the high refractive index hard coat layer is laminated so that it is situated at a position nearest to the contact surface to the display medium, and at least one of the high refractive index hard coat layer, high refractive index layer and middle refractive index layer is a cured layer containing rutile type titanium oxide coated with an inorganic compound decreasing or eliminating a photocatalyst activity and an organic compound and/or organometal compound having an anionic polar group and having a primary particle size in the range from 0.01 to 0.1 µm, and a dispersing agent having a molecule structure in which a side chain composed of an anionic polar group or a side chain having an anionic polar group is bonded to a principal chain having a skeleton of an ethylene oxide chain, uniformly mixed in the cured binder.

46. An intermediate product according to claim 45 wherein the high refractive index hard coat layer formed of the cured layer has an anti-glare fine irregular surface.

47. An intermediate product according to claim 45 wherein the high refractive index layer and/or middle refractive index layer is formed of the cured layer and has an anti-glare fine irregular surface.

48. An intermediate product according to claim 45 wherein the high refractive index hard coat layer formed of the cured layer has a layer thickness of 0.2 to 20 µm, has a refractive index of 1.55 to 2.30, and a haze value according to JIS-K 7361-1 is the same as in the case of using only the substrate or a difference from the haze value in the case of using only the substrate is within 10%.

49. The intermediate product according to any one of claims 42, 43, 44, 45, 46, 47, and 48 in which the cured layer is a coating layer obtainable by applying a coating composition containing, as essential components, (1) rutile type titanium oxide coated with an inorganic compound decreasing or eliminating a photocatalyst activity and an organic compound and/or organometal compound having an anionic polar group, and having a primary particle size in the range from 0.01 to 0.1 µm, (2) a binder component having an ionizing radiation-curing property, (3) a dispersing agent having an anionic polar group, wherein the dispersing agent is a compound having a molecule structure in which a side chain composed of an anionic polar group or a side chain having an anionic polar group is bonded to a principal chain having a skeleton of an ethylene oxide chain, and having a number-average molecular weight of 2000 to 20000, and (4) an organic solvent on a surface to be coated with the cured layer and curing the composition.

50. A coating layer according to claim 19 wherein the dispersing agent has a molecule structure in which a side chain composed of an anionic polar group or a side chain having an anionic polar group is bonded to a principal chain having a skeleton of an ethylene oxide chain.

51. A coating layer according to claim 19 wherein the binder is a cured product of one or more components selected from the group consisting of pentaerythritol poly-functional acrylates, dipentaerythritol poly-functional acrylates, pentaerythritol poly-functional methacrylates and dipentaerythritol poly-functional methacrylates.

52. The intermediate product according to claim 48 wherein the cured layer is a coating layer obtainable by applying a coating composition containing, as essential components, (1) rutile type titanium oxide coated with an inorganic compound decreasing or eliminating a photocatalyst activity and an organic compound and/or organometal compound having an anionic polar group, and having a primary particle size in the range from 0.01 to 0.1 µm, (2) a binder component having an ionizing radiation-curing property, (3) a dispersing agent having an anionic polar group, and (4) an organic solvent on a surface to be coated with the cured layer and curing the composition.

* * * * *